(12) United States Patent
Day

(10) Patent No.: US 8,769,077 B2
(45) Date of Patent: *Jul. 1, 2014

(54) PARAMETERIZED RECURSIVE NETWORK ARCHITECTURE WITH TOPOLOGICAL ADDRESSING

(71) Applicant: Tria Network Systems, LLC, Orlando, FL (US)

(72) Inventor: John D. Day, Foxboro, MA (US)

(73) Assignee: Tria Network Systems, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,654

(22) Filed: Dec. 21, 2012

(65) Prior Publication Data

US 2013/0097301 A1  Apr. 18, 2013

Related U.S. Application Data

(63) Continuation of application No. 13/329,724, filed on Dec. 19, 2011, now Pat. No. 8,352,587, which is a (Continued)

(51) Int. Cl.

| | | |
|---|---|---|
| G06F 15/173 | (2006.01) | |
| H04L 29/12 | (2006.01) | |
| H04L 29/06 | (2006.01) | |
| H04L 29/08 | (2006.01) | |
| H04L 12/56 | (2006.01) | |
| H04W 40/24 | (2009.01) | |
| H04W 80/04 | (2009.01) | |
| H04Q 3/00 | (2006.01) | |
| H04W 8/08 | (2009.01) | |
| H04W 8/26 | (2009.01) | |

(52) U.S. Cl.
CPC ........ H04L 61/2061 (2013.01); H04L 61/2084 (2013.01); H04L 65/1069 (2013.01); H04L 65/605 (2013.01); H04L 69/24 (2013.01); H04L 69/32 (2013.01); H04L 69/325 (2013.01); H04L 69/329 (2013.01); H04L 47/193 (2013.01); H04L 47/21 (2013.01); H04L 47/2416 (2013.01); H04L 67/2823 (2013.01); H04L 67/306 (2013.01); H04L 67/42 (2013.01); H04W 8/087 (2013.01); H04W 8/26 (2013.01); H04W 40/248 (2013.01); H04W 80/04 (2013.01); H04Q 3/0054 (2013.01); H04Q 3/0095 (2013.01)
USPC ........... 709/223; 709/230; 709/248; 370/389; 370/400; 370/469

(58) Field of Classification Search
USPC ........... 709/223, 230, 248; 340/389, 400, 469
See application file for complete search history.

(56) References Cited

U.S. PATENT DOCUMENTS

| | | |
|---|---|---|
| 6,092,096 A | 7/2000 | Lewis |
| 6,502,131 B1 | 12/2002 | Vaid |

(Continued)

*Primary Examiner* — Kyung H Shin

(74) *Attorney, Agent, or Firm* — Guntin & Gust, PLC; Andrew Gust

(57) ABSTRACT

A digital data communications network that supports efficient, scalable routing of data and use of network resources by combining a recursive division of the network into hierarchical sub-networks with repeating parameterized general purpose link communication protocols and an addressing methodology that reflects the physical structure of the underlying network hardware. The sub-division of the network enhances security by reducing the amount of the network visible to an attack and by insulating the network hardware itself from attack. The fixed bandwidth range at each sub-network level allows quality of service to be assured and controlled. The routing of data is aided by a topological addressing scheme that allows data packets to be forwarded towards their destination based on only local knowledge of the network structure, with automatic support for mobility and multicasting. The repeating structures in the network greatly simplify network management and reduce the effort to engineer new network capabilities.

20 Claims, 20 Drawing Sheets

Related U.S. Application Data continuation of application No. 10/546,018, filed as application No. PCT/US2004/006907 on Mar. 5, 2004, now Pat. No. 8,103,797.

(60) Provisional application No. 60/452,812, filed on Mar. 7, 2003.

(56) References Cited

U.S. PATENT DOCUMENTS

| | | | |
|---|---|---|---|
| 6,728,267 B1* | 4/2004 | Giese et al. | 370/469 |
| 7,383,321 B2 | 6/2008 | Moyer | |
| 2002/0172207 A1* | 11/2002 | Saito et al. | 370/400 |
| 2003/0014623 A1 | 1/2003 | Freed | |

* cited by examiner

PARAMETERIZED RECURSIVE NETWORK ARCHITECTURE WITH TOPOLOGICAL ADDRESSING

CROSS-REFERENCE TO RELATED APPLICATIONS

This application is a continuation of U.S. patent application Ser. No. 13/329,724, filed Dec. 19, 2011, which is a continuation of U.S. patent application Ser. No. 10/546,018 filed Jun. 22, 2006 now U.S. Pat. No. 8,103,797, which claims priority to and was a national stage entry under 35 U.S.C. 371 of International Application No. PCT/US2004/006907 filed on Mar. 5, 2004, which claimed the benefit of U.S. Provisional Patent Application No. 60/452,812 filed Mar. 7, 2003, the disclosures of all of which are incorporated herein by reference in their entirety.

FIELD OF THE DISCLOSURE

The present invention relates generally to digital networks, and in particular, to a parameterized, recursive network architecture with topological addressing.

BACKGROUND OF THE DISCLOSURE

Conventional computer networks typically require protocols to maintain shared state between the communicating entities. These generally take one of two forms: those concerned exclusively with the transfer of data; and those concerned with applications. The first represents a fairly constrained problem that considers addressing, error detection and recovery, flow control, sequencing, etc. Application protocols serve the entire range of applications and hence take on many forms. But even here, within specific problem areas, there can be a fair amount of commonality.

Many protocols have been proposed over the past 25 years to solve the problems of existing data transfer approaches: HDLC and its variants, X.25, TCP, IP, delta-t, TP4, CLNP, XTP, XNS Sequenced Packet, SCTP, RIP, the various forms of IEEE 802, etc. Numerous theses have been written proposing various data transfer protocols to address specific situations. Each of these protocols has its own syntax and behavior. Each must be implemented as a distinct whole. The result has been growing complexity. A typical system may have to support as many as 20 of these protocols and the number of protocols that a company must support in its products is in the 100s. This proliferation continues unabated.

In addition, the use of addressing in data networks has been a major problem almost from the beginning of computer networks. The earliest addresses for host computers were the hardware port addresses of the switches. The number of switches in a network was sufficiently small that a simple flat address space was sufficient. As networks grew, flat address spaces and the naming of ports became problematic for networks. To route data in a computer network, addresses had to indicate "where" the, destination was. Without such an indication, switches have to store routes to all possible destinations. When the number of destinations was a few 10s or 100s this was not a problem. But as it became millions and billions the problem became more severe. Furthermore, naming the port was acceptable as long as a computer had a single connection to the network. But once computers needed more than one connection for redundancy, problems arose. Since each connection had a separate address, the routing algorithms in the network could not tell that two addresses actually went to the same place. Since they had different addresses they appeared to be different destinations.

There has been little or no advance in the practices of addressing, for example, since the earliest days of the computer networking. Addressing in today's Internet is essentially equivalent to the addressing in networks of the early 1970s. Some progress has been made in aggregating routes by imposing Classless Inter-domain Routing (CIDR) on a small set of IP addresses. But this only accounts for issues of route aggregation and does not address issue of multihoming and mobility. While there has been some discussion of so-called topologically dependent names, in fact these are in mathematical terms actually graph dependent names. In the networking literature, topology is often used to be synonymous with graph. (In the following description of the present invention, the term "topology" will be used to connote a function with specific properties that maps between one or more sets or graphs or a set of graphs for which such a function can be constructed.)

Traditionally, computer networks have been organized according to two fundamentally different approaches: 1) beads on a string or 2) layers. The "beads-on-a-string" model has been primarily used in networks with a telephony background. In this model, the components of the network are viewed as functionally distinct modules connected by interconnecting media. While this approach is not favored for data networks like the Internet, the approach still drives certain technologies in use today, such as ATM.

The functional components of most data networks have been based on a model taken from operating systems composed of functionally distinct layers. The primary characteristics of this approach are: each layer is a black box that hides the complexity of the internal mechanisms of the operation of the layer from the layer above. Hence, a layer provides an abstraction of its mechanisms to the layer above. The service provided by each higher layer is more abstract. Mechanisms that are found in one layer should not need to be repeated in higher layers. This model has been the basis for the OSI Reference Model (ISO 7498), XNS, and for the Internet architecture. However, there have always been problems with this approach both in terms of accommodating requirements of applications and its ability to scale.

It would therefore be desirable to provide methods and systems that enable simpler and more efficient transport of data across networks.

SUMMARY OF THE INVENTION

Disclosed are methods and systems for simpler and more efficient transport of information across networks. The methods described below are intended to work alongside or replace conventional Internet protocols to address and obviate current scaling limits of the Internet and other networks.

In one aspect, by separating mechanism and policy in protocols and adopting a compilation approach to syntax, the invention enables the entire range of data transfer protocols to be reduced to only two protocols: an error and flow control protocol, and relaying and multiplexing protocol. Further, application protocols are characterized as essentially a specialization of data transfer protocols to which the separation of mechanism and policy can be applied to broaden their scope and reduce their complexity.

In another aspect of the invention, topological addressing methods and systems are provided to enable improved transport. In a further aspect, by utilizing the invariant structure of protocols, combined with topological addressing to identify the location of elements of a network, a repeating, recursive structure is obtained that enables scaling and other significant improvements over conventional network methods.

This aspect of the invention constructs a layered architecture for computer networks in which each layer provides an abstraction of the layer below, but the functionality of each layer is the same. Each layer manages a different range and scope of the problem. This construction of a recursive architecture composed of a repeating element yields significant technical advantages over conventional architectures.

BRIEF DESCRIPTION OF THE DRAWINGS

These and other features of the invention are described in detail below and illustrated in the attached drawing figures, as follows.

DETAILED DESCRIPTION OF THE DRAWINGS

Overview

The following Detailed Description of the Invention, with reference to the attached drawing figures, presents examples, practices and embodiments of the invention, and is organized into the following sections:

I. Network Protocols with Invariant Structure
II. Topological Addressing
III. Recursive Structure and Methods
IV. Algorithmic Implementations
V. Technical Advantages

I. Network Protocols with Invariant Structure

1. Elements of a Protocol

The invention described in this document provides methods and systems that can be implemented in otherwise conventional digital processing networks (whether for data, voice, VoIP, or any other type of information, signals or data), for improving information transfer within and across such networks. Before embarking upon a description of the illustrated embodiments, we first provide an overview of relevant features and issues in conventional networks.

Figure 1:
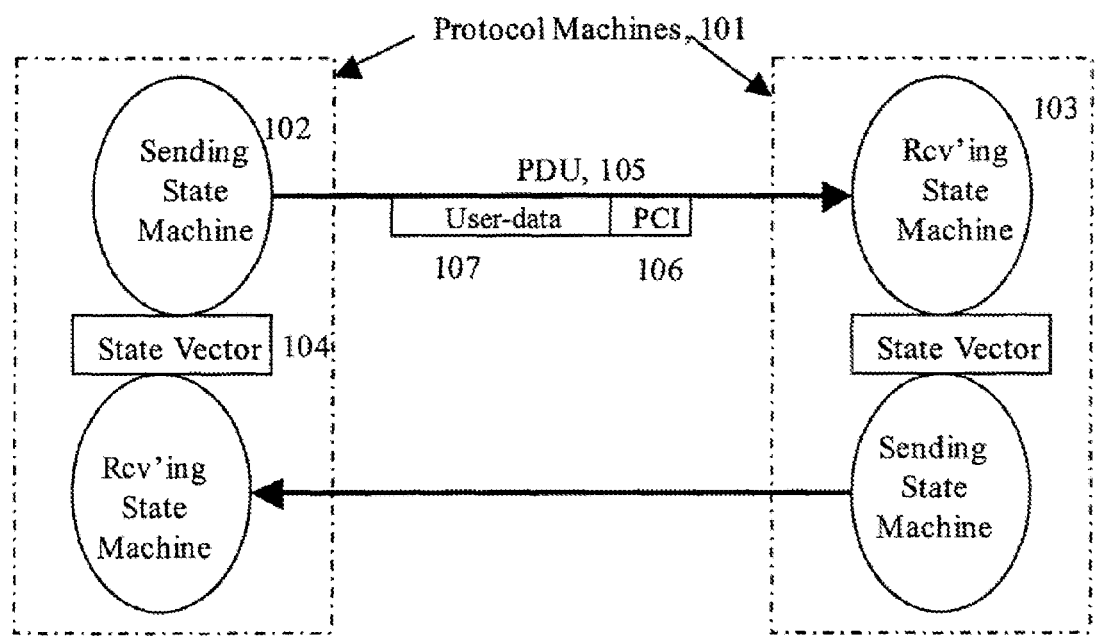
FIG. 1 is a schematic diagram depicting the internal structure of a conventional protocol state machine typical of the prior art.

Referring now to FIG. 1, in a conventional network, protocols are typically modeled as protocol state machines or protocol machines (PM) 101. Each PM is effectively two state machines, i.e., a sending state machine and a receiving state machine (102, 103) that share state through a local state vector 104. As shown in FIG. 1, two or more PMs coordinate their behavior by exchanging messages or protocol data units (PDUs) 105. The sending state machine of one PM sends PDUs to the receiving state machine of another PM. A protocol may have one or more types of PDUs. A POU consists of 2 parts: Protocol Control Information (PCI) 106 which is interpreted by the PM and User-Data 107, which is ignored and passed transparently to a using process, possibly a higher layer protocol.

1.1. Associations, Connections and Flows

Since conventional communicating systems do not have common state, i.e. shared memory, in such systems one Protocol Machine (PM) must be able to notify the other of important changes in state. This is accomplished by exchanging finite amounts of information, i.e. a protocol-data-unit (PDU). These PDUs carry information that is used to update a PMs view of its correspondent's state. This continual exchange of PDUs between the PMs creates a binding between the PMs. These bindings are characterized by the amount of shared state and by the "strength" of the binding. The strength of the binding is a measure of how tightly coupled the PMs are, i.e. the maximum time that the states of the two protocol machines will differ. It has been useful to recognize a form of binding within systems and three degrees of such bindings between systems: a minimal binding requiring no exchange of updates; a weak binding with some dependence but not affected if some updates are lost; and a strong binding, which requires updates to be received to avoid pathological behavior.

The following terminology will be used for the forms of this relation, although those skilled in the art will appreciate that other similar terminology may be employed:

an association has the minimal shared state and minimal coupling, often associated with connectionless communication, a flow, has more shared state but not as tightly coupled, as found in protocols without feedback and a connection has more tightly coupled generally with application protocols and end-to-end transport protocols or data link protocols with feedback mechanisms.

a binding has very tightly coupled shared state between PMs in the same system, usually implemented by some "shared-memory" technique.

A flow and a connection are specializations of an association. While a flow or connection has all of the properties of an association, the reverse is not true.

1.2. Mechanism and Policy

Figure 2:
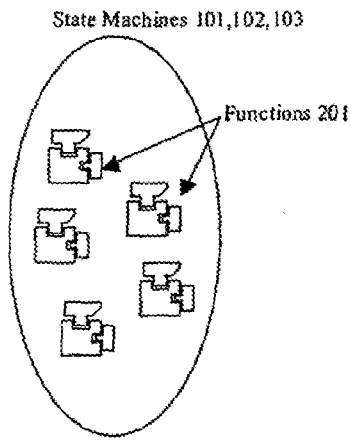
FIG. 2 is a schematic diagram depicting functions within a conventional protocol state machine like that shown in FIG. 1.

Referring now to FIG. 2, in a conventional network, each state machine 102 or 103, sending and receiving, can be in turn decomposed into distinct coordinated modules or functions 201. These functions represent loci of behavior for sequencing, error detection, flow control, etc. The conventional definition is a protocol can be composed of a set of functions that achieve the basic requirements of that protocol, whether that is error control, reading a file, flow control, two-phase commit, etc. The choice of functions is made based on the operating region in which the protocol is intended to exist and the desired level of service that is to result from its operation.

Figure 3:
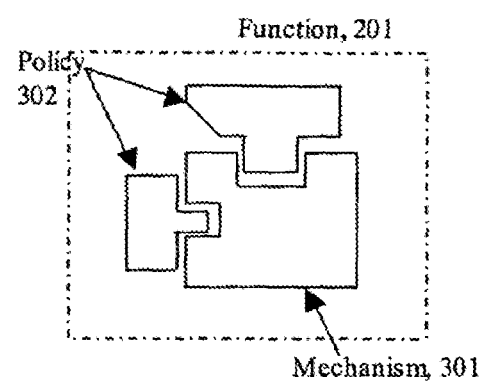
FIG. 3 is a schematic diagram depicting mechanism and policy within a function and FIG. 4 is a schematic diagram depicting policy management.
Figure 4:
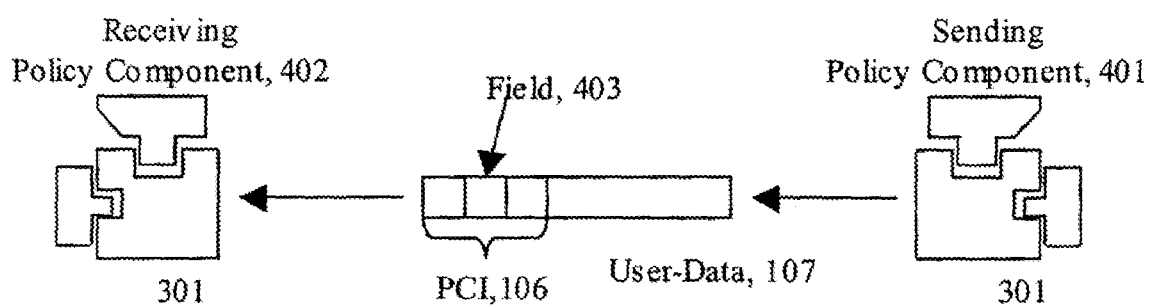

In accordance with the present invention, as shown in FIG. 3, each function may be further decomposed into a basic mechanism 301, and one or more policies 302. Mechanisms are static and are not changed once a protocol is specified. The number of distinct types of policy associated with each mechanism depends on the mechanism. The number of policies of a specific type is theoretically unlimited, although in practice only a few are used. In particular, as shown in FIG. 4, there is typically at least a sending policy 401, associated with the mechanism 301 in the sending state machine, which is coordinated with a receiving policy 402 associated with the mechanism 301 in the corresponding receiving state machine. The coordination of the mechanisms in the sending and receiving state machines is accomplished by exchanging specific fields of information 403 in the protocol-control-information (PCI), 106, of a PDU, 107. A single PDU may carry fields for multiple mechanisms in its PCI. The order of interpreting the fields of the PDU is determined by the state machine. A major consideration in the design of protocols is determining what fields are assigned to which PDUs. User-data is not processed or interpreted by either state machine of this data transfer protocol and is delivered to a higher level protocol machine or application protocol. This user-data may contain PCI for a higher level protocol.

Different policies can be chosen at the time communication is initiated and, if care is taken, policies can be modified during data transfer. For anyone mechanism, there are a variety of policies that may be applied to it. For example, consider the basic sliding window flow control mechanism used in many conventional protocols. The sliding window is part of the protocol specification. Once specified, this mechanism is not modified. However, there are a variety of policies for flow control: from simply extending new credit on receipt of a PDU, to periodically sending new credit, to high/low watermarks, to slow start, etc. that might be used for different users at the same time. Similarly, acknowledgement is a mechanism, but when an ack (acknowledgement) is sent is policy.

In accordance with the present invention, the Applicant has discovered that by separating policy and mechanism, the operating range of a protocol can be increased and its ability to optimally serve a particular subset of an operating region can be greatly enhanced. The choice of policy depends on the traffic characteristics of the (N−1)-association and the Quality of Service (QoS) required by the user. The task of the (N)-PM is to translate these QoS characteristics as requested by the (N+1)-PM into a particular choice of mechanisms and policies based on the service from the (N−1)-PM. The Applicant has also discovered that protocols nearer the media tend to have policies dominated by the characteristics of the media and consequently fewer policies would apply. For protocols further from the media there would be a wider variety of policies that might apply. Cleanly separating policy from mechanism is an important consideration in the design of a protocol that is capable of serving a wide range of QoS parameters while achieving a higher degree of optimality.

There has been much talk of policy in the network literature, but generally limited to application protocols, such as routing. There have been proposals for protocols with optional mechanisms and policies that are specified at execution time. In general, these protocols have considerable overhead either in bandwidth, processing or both. The present invention, along with a pragmatic approach to selecting policy, achieves a useful solution to these problems. The mechanisms of a protocol are fixed at the time of specification, while selecting policies is postponed until the allocation phase. Mechanisms are fixed, although an appropriate policy could, in effect, make the mechanism null.

All protocols should include a common mechanism for negotiating policy for all mechanisms during the allocation phase. Modifying policy during the data transfer phase can create synchronization problems. The mechanisms to handle these synchronization issues are in general equivalent to performing initial state synchronization, i.e. to creating a new connection or flow, especially in data transfer protocols. Hence, for data transfer protocols, it is not necessary to include distinct mechanisms for changing policies, it is only necessary to create a new flow or connection.

The policy negotiation mechanism is part of the protocol so that its use will be coordinated with the operation of the protocol. The process, which determines what policies should be used or when they are changed is outside the protocol but is part of the layer operation. In some cases, it may be initiated by "layer management", which manages the operation of the protocol(s) in a layer to ensure that the parameters agreed with the layer above are maintained, or in response to changes observed in the characteristics of the layer below, or to achieve more high level management strategies.

1.3. Types of Mechanisms

In accordance with the invention, a protocol mechanism is a function of specific elements of Protocol Control Information (PCI) and the state variables of the PM that yields changes to the state variables and one or more PDUs. These elements of PCI are conveyed to the peer PM(s) by one or more PDUs to maintain the consistency of the shared state for that mechanism. Some mechanisms may use the same elements, e.g. sequence numbers are used both for ordering and lost and duplicate detection.

Considering the fields that appear in the PCI of most protocols associated with these mechanisms, the applicant finds that they naturally cleave into three groups:

tightly-bound fields, i.e. those which must be associated with the user-data, i.e., the Transfer PDU;

loosely-bound fields, i.e. those for which it is not necessary that the fields be associated with the user-data; and a significant subclass of synch-bound fields, i.e. those that are required only to establish shared state and to achieve the initial synchronization of state.

Tightly bound fields, such as sequence numbers for ordering, or the CRC for detecting data corruption must be part of the PCI of the Transfer PDU. Loosely bound fields such as those associated with flow control, or acknowledgements may be, but do not have to be associated with the Transfer or Data PDU. Synch-bound fields are associated with state synchronization and policy negotiation and occur in PCI associated with the allocation phase. A protocol may have one PDU type with all PCI carried in every PDU as with TCP, or more than one as with XNS, TP4, or X.2S. Distinguishing loosely-coupled mechanisms introduces additional flexibility and asynchrony into the operation of the protocol.

Similarly, a tightly-coupled mechanism is defined as one that is a function of only tightly-bound fields; while a loosely-bound mechanism is a function of at least one loosely bound field. A synch-bound mechanism is a function of only fields involved during synchronization or allocation.

1.4 Data Transfer Mechanisms

Figure 6:
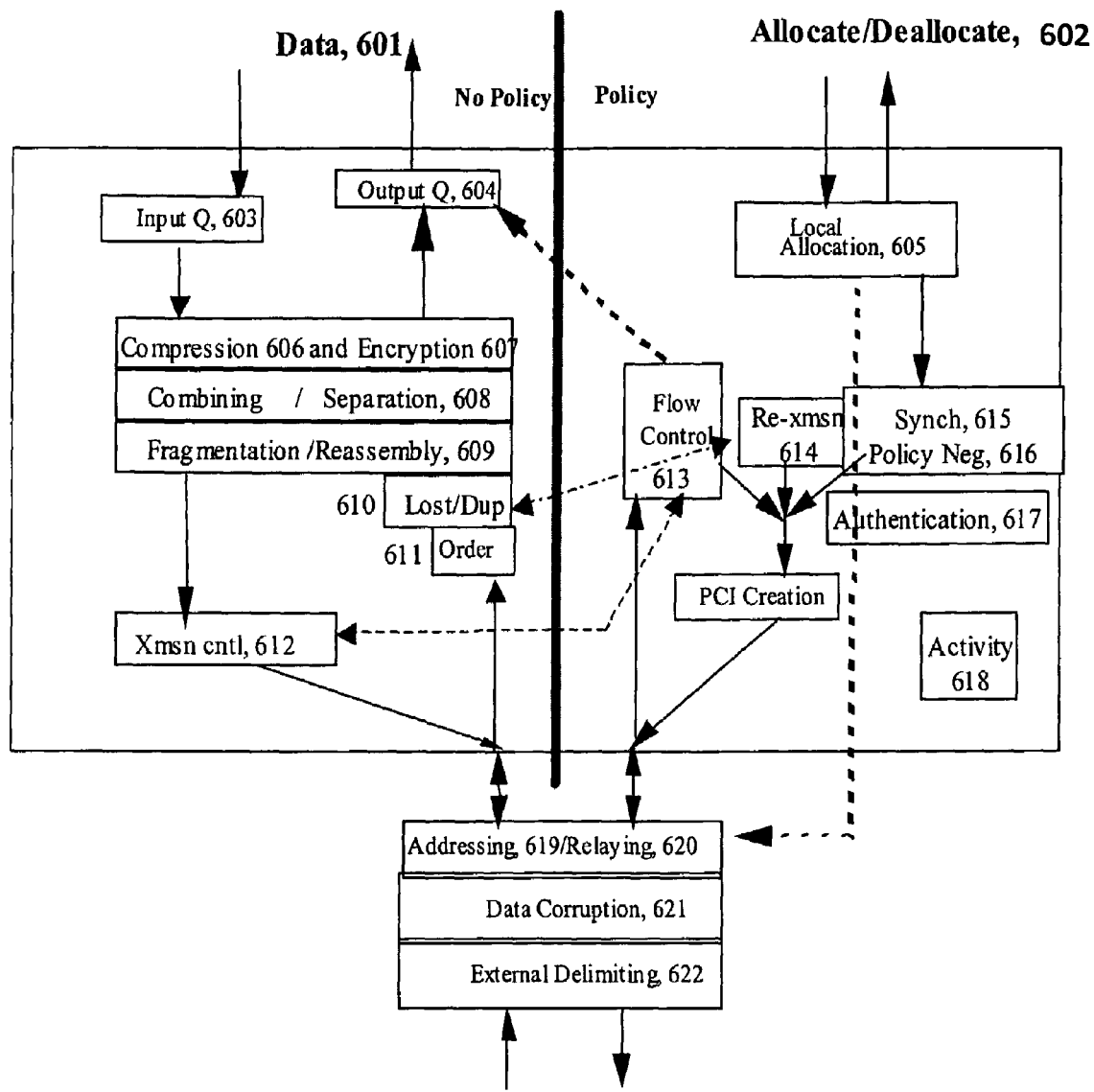
FIG. 6 is a schematic diagram depicting a typical implementation strategy for a protocol machine in accordance with the present invention.

In conventional networks, the mechanisms that appear in data transfer protocols are reasonably well understood. The same set appears with regularity and hence can be readily incorporated into common protocols. We will next briefly review these mechanisms with an indication of the types of policies associated with them, with reference to FIG. 6. These mechanisms are as follows:

Delimiting: A mechanism used to indicate the beginning and end of a PDU. There are two basic methods for delimiting PDUs: external 622 and internal delimiting. In external delimiting, a special bit pattern, usually called a flag sequence, is defined to denote the start and end of the PDU. With this approach either data transparency is forfeited, since the flag sequence cannot occur as a bit pattern in the PDU, or some "escape" mechanism is used to insert extra bits into the PDU to avoid the flag sequence. This "escape" flag is then removed by the receiver before any other PDU processing is done. In internal delimiting, the PDU contains a length field as an element of PCI from which the number of bits or octets to the end of the PDU can be calculated. A degenerate form of internal delimiting is that the supporting service provides only complete PDUs with a length field passed as a parameter as part of the interface. External delimiting is generally found in those protocols operating closest to the media e.g. data link protocols, such, as HDLC, or the IEEE LAN protocols. Higher level protocols have generally used internal delimiting.

State Synchronization: Before data transfer can begin the shared state of the PMs must be initialized, 615. This mechanism achieves this initialization. Three basic forms are generally found:

1) the creation of local bindings with the (N+1)-PM and (N−1)-PM; no PDUs are exchanged;

2) the former plus the exchange of request and response PDUs, the so-called 2-way handshake; and 3) a more robust form consisting of the former, a request, a response and an ack by the initiator when the response arrives, the so-called 3-way handshake.

The first is used for connectionless communication in protocols, such as IP and UDP. The second is used for protocols with loosely coupled mechanisms or the probability of an error during synchronization is unlikely or where a lack of synchronization between the PMs can cause aberrant protocol behavior, and/or where the probability of an error in the supporting communication service is unlikely. The third is used for protocols with tightly coupled mechanisms or where the probability of an error during synchronization is likely to cause aberrant protocol behavior, and/or where the probability of an error in the supporting communication service is likely. Protocols like HDLC, X.25, TP Class 2 and most application protocols use the 2-way handshake. Protocols like TCP, TP4, or XNS Sequenced Packet use the 3-way handshake.

Policy Selection: As noted above and illustrated in FIG. 6, the functions of a protocol are composed of a mechanism and a policy. The mechanism is that part of the function that is a fixed part of the protocol. This mechanism allows selection of policy, 616. Very few widely used protocols have this kind of a mechanism. For example, the Open Systems Interconnect (OSI) group uncovered the requirement for this mechanism in two specific cases in the presentation and application protocols, which they called presentation-context or application-context, but did not realize it, as the Applicant sets forth herein, as a general property of all protocols. Many protocols have a list of parameters associated with the synchronization procedures, but these are not tied directly to the mechanisms in as direct a manner as intended here. HDLC has an extensive mechanism for selecting various options, but again only some of these are related to mechanism/policy, e.g. choosing different CRCs, width of flow control windows, etc. While present in the standard, it is seldom used in practice.

Addressing: Most protocols must contain some means to identify the source and destination of the PDUs, 619. This is done by including addressing fields in the PCI to either the type level or to the type and instance level. (The latter being preferred.) Generally, it is the (source, destination) pair that disambiguates one flow from other flows. Hence the necessity for identification to the instance.

Relaying: Most networks are not fully connected meshes. Consequently, some protocols may improve the connectivity provided by the supporting service by relaying a PDU from one PM to the next. This mechanism is accomplished by including a PCI element that contains the address of the destination. In most cases, the PCI will also contain the address of the source. When a PDU arrives, the relaying mechanism, 620, inspects the address and determines whether or not it is addressed to one of its (N+1)-PMs. If it is, then it is delivered to the appropriate (N+1)-PM. If not, it consults information it maintains and determines the (N−1)-PM that can get the PDU closer to its destination. The area of addressing, relaying, and routing is discussed in greater depth elsewhere herein.

Multiplexing: Since networks are not fully connected meshes when PDUs are relayed, PDUs from different flows and from different sources will be sent on the same outgoing flow. Similarly, a system may have a number (N+1)-PMs sending data but flows with fewer (N−1)-PMs. These flows are passed to an (N)-PM which must combine them into a single flow. Both of these are called multiplexing. Thus, there is a natural tendency for there to be a close relation between a flow id and an address. This mechanism is achieved by an aggregation application (see below) and uses addressing, 619, and relaying, 620.

Ordering: Most but not all protocols assume simple ordering, i.e. PDUs will arrive in the same order they were sent. However, some supporting communication services do not guarantee this property. This ordering mechanism (611 in FIG. 6) is provided by including a sequence number as an element of PCI which is incremented in units of octets (length of the user data in the PDU) or in units of PDUs so that the PDUS may be ordered at the receiver. A large number of protocols include this mechanism, e.g. TCP, X.25, TP4, HDLC, etc. Application protocols generally assume order is provided by the supporting service and do not explicitly include this mechanism. As noted above, there are applications which require ordering but do not require all PDUs to be received as long as not too many are lost.

Stream vs. Record 601: Data may be delivered to the higher layer PM, either as an undifferentiated stream of bytes or in the same finite service-data-units (SDUs) delivered to the sending PM.

The Applicant has discovered a simple mechanism that allows both to be supported. Two control bits are defined in the PCI: one indicates the end of an SDU (More Data) and the other indicates whether the PM can deliver partial SDUs to the higher level user (partial Delivery). If Partial Delivery is not allowed and the More Data bit is used to indicate the end of SDUs, then SDU boundaries are preserved. If the More Data bit is always set (in effect making all of the traffic sent on the connection a single SDU) and partial delivery is allowed, then Stream mode is supported. And further, there are applications with long SDUs, where partial delivery is advantageous. In these cases, delivery of data would be allowed before the end of the SDU.

Fragmentation/Reassembly 609: The practical constraints of networking often require that SDUs and user-data be fragmented into smaller PDUs for transmission and then reassembled at the other end. This is generally accomplished through a variety of means by including PCI elements: a single bit that indicates whether or not this is the last fragment; the use of the sequence number, or by a distinct enumeration of the fragments. Techniques may also involve the length field of the PDU used for delimiting and detecting data corruption.

Combining/Separation 608: Conversely, the protocol may achieve some efficiency by combining SDUs into a single PDU. Once again, a variety of techniques have been used, ranging from fixed length SOU to a chain of length fields, etc.

The efficiency of fragmentation and combining will be directly effected by the scope within which the resulting PDUs must be recognizable. For a fragmented PDU to be concatenated with any other PDU, it must be identified within the scope of the layer. However, for a PDU to be concatenated only with PDUs from the same system requires 30 identifiers of less scope (and hence shorter PCI).

Data Corruption Detection 621: During transmission, the contents of a PDU can be corrupted. There two fundamental mechanisms for dealing with this problem. The first is the use of a checksum or cyclic redundancy code (CRC) to detect the corruption. The code is computed on the received PDU. If it fails, the PDU is discarded and other mechanisms ensure its retransmission. The second, a Forward Error Correcting code which can detect and correct some number of errors, in which case the PDU may not have to be discarded. The codes used must be chosen based on the nature of the error environment. For example, the traditional view has been that protocols closer to an electrical media are more subject to burst errors and thus require codes that can detect bursts of errors, e.g. data link protocols like HDLC or the various LAN protocols. However, optical media have different error characteristics and thus require a different kind of error code. While protocols more removed from the media, e.g. !P, TCP, X.25, or TP4, are more likely to encounter single bit errors (memory faults) and use error codes that detect single bit errors. In addition, the error characteristics may interact adversely with other aspects of the protocol design, such as the delimiters. For example, putting the CRC PCI element in a trailer has often been proposed as being more efficient and is done in HDLC. However, it can have the effect of undermining the error characteristics of the protocol in a variable length PDU, since the PM may mistake something else for the end of frame and thus use the wrong octets for the calculating the CRC. The error characteristics of the protocol are greatly improved if the CRC is in a fixed position relative to the beginning of the PDU. In general, a careful error analysis of both the protocol and the proposed operating environment must be done to determine the appropriate data corruption detection strategy.

Lost and Duplicate Detection, 610: Because relaying occurs in various supporting services and the normal response to congestion or corrupt PDUs is to discard the PDUs, entire PDUs may be lost. Since these PDUs must be re-transmitted, this may lead to duplicate PDUs being generated. The sequence number PCI element used for ordering is also used for lost and duplicate detection. The receiving PM keeps track of the sequence numbers, as PDUs arrive. If a PDU arrives out of order, the PM knows there is a gap and may after some time assume the missing PDUs are lost and request a retransmission. If a PDU arrives for a sequence number that has already been received, 30 it is a duplicate and is discarded.

Flow Control: A flow control mechanism 613 is used to avoid the sender sending data faster than the destination can receive it. Two basic forms of flow control are used:

1) A credit scheme, where the destination tells the receiver how many messages it can send before receiving more credit. This scheme is sometimes linked to the acknowledgement mechanism such that the flow control policy extends more credit whenever an ack is received.

2) A pacing scheme, where the destination indicates to the sender the rate at which data can be sent.

Both schemes may use units of either octets or PDUs.

Transmission Control 612: Many protocols utilize a policy to determine when to send data and how much to send in addition to the policies imposed by flow control exercised by the destination. The slow-start algorithm in TCP is a prime example of a policy used with this mechanism.

Re-transmission Control 614: Retransmission control mechanism, 6-5 often referred to as acknowledgement, is used by the destination to tell the receiver that the PDUs have been successfully received. The most prevalent scheme includes the sequence number as an element of PCI that indicates that all PDUs with sequence numbers less than this have been received. If the sender does not receive an ack for a sequence number after a given period of time, it automatically retransmits all PDUs up to the last PDU sent. When an ack is received, the sender may delete PDUs from its list of potential re-transmissions with a lower sequence number. For environments with a large bandwidth-delay product, a more complex mechanism of selective ack or nack is used to notify the sender of specific errors and thus limit the number of PDUs retransmitted and to shorten the time taken to recover from the error, i.e. not wait for the retransmission time-out.

Compression 606: This mechanism is used to improve transmission efficiency by applying data compression to the user-data. The policy for this mechanism selects the compression algorithm to be used.

Authentication 615.617: This mechanism is used to allow the destination to authenticate the identity of the source. The policy associated with this determines the authentication algorithm to used.

Security 607: This mechanism is used to provide data confidentiality, data integrity, access control and non-repudiation facilities. The policies associated with these mechanisms determine the specific algorithms to be used.

Activity Mechanism 618: This mechanism is used on connections which have long periods of no traffic. This mechanism, often referred to as a keep-alive, allows the correspondents to determine that the other is still there and in a consistent state. The policy associated with this mechanism determines the frequency of the keep-alive PDUs.

1.5. Types of Protocols

In accordance with the invention, reviewing this list of common protocol mechanisms and their role in protocols, several patterns begin to emerge. First there are mechanisms that might appear in any protocol, such as delimiting, allocation, policy negotiation, data corruption, etc. Second is the similarity in transport protocols and data link protocols. They both are primarily concerned with end-to-end error and flow control. It is just that the "ends" are in different places, they have different scopes. Similarly, network and MAC protocols are similar in that they primarily deal with relaying and multiplexing. But as the Applicant has discovered, there is an even more fundamental commonality underlying the pattern: in the relaying and multiplexing protocols policy is always imposed by the sender; in the error and flow control protocols policies are always imposed by the receiver; they are feedback mechanisms.

Connections include feedback mechanisms; associations and flows do not. Similarly, the more robust three-way handshake synchronization mechanism is required for protocols with feedback; a two-way handshake or none for protocols with no feedback.

Figure 5:
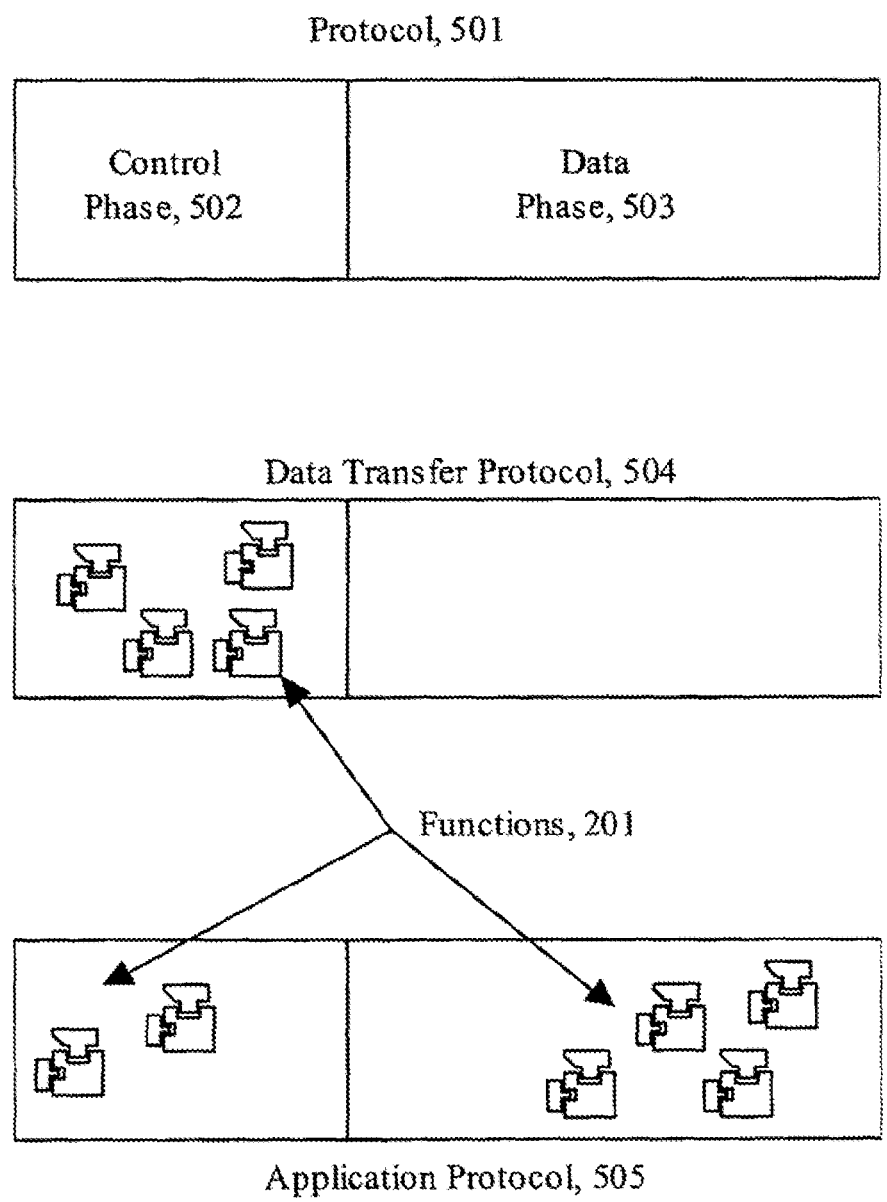
FIG. 5 is a schematic diagram depicting how protocols contain a control phase and a data phase.

As shown in the example of FIG. 5, protocols have a control aspect 502 and a data aspect 503. Data transfer protocols 504 consist only of functions in the control aspect, while application protocols 505 have functions in both the control aspect and the data aspect. In general, the control aspect of application protocols is minimal (subject to certain exceptions). Thus, the Applicant has discovered that there are essentially only three fundamental types of protocols: Relaying and Multiplexing protocols and Error and Flow control protocols, and Application protocols.

The composition of these protocols can take on two basic forms: a more traditional form following the pattern found in IP, TCP and applications, or a form based on the nature of the mechanisms. Both are applicable and both can benefit from the separation of mechanism and policy in a general way. Taking these protocols in turn:

Relaying and Multiplexing Protocols: In the first form of such protocols, these protocols will consist of primarily the relaying and multiplexing mechanisms and mechanisms related to resource allocation. The Transfer PDU will consist primarily of the addressing necessary to identify the flow. These protocols are characterized by only sufficient shared state to deliver data and in some forms may appear to be only a common header for the error and flow control protocol.

In a second form, this protocol contains all mechanisms that are tightly bound to the Transfer PDU. In this form, there may be either no state synchronization as in the traditional form or at most a two-way handshake to create the necessary shared state.

Error and Flow Control Protocols: In the first form, the Error and Flow Control protocols will consist of data corruption, lost and duplicate detection, acknowledgement, and flow control, and related mechanisms. Since these protocols use feedback mechanisms, a three-way handshake is required to create the initial shared state.

In the second form, this protocol will consist only of the mechanisms that are loosely coupled to the Transfer PDU. Consequently, a 3-way handshake is required for creating the initial shared state.

Policies will be chosen to optimize performance based on their position in the architecture. Protocols nearer the application will have policies suited to the requirements of the application. Since there are many applications over these protocols they will use a wider variety of policies. Protocols nearer to the media will be dominated by the characteristics of the media. Since these protocols have less scope and are specific to a specific media they will use a smaller range of policies.

Application Protocols: Application protocols are essentially data transfer protocols that further refine the use of the data transfer phase. Applications add new mechanisms (with attendant policies) within the data transfer phase. These mechanisms are generally unique to the application or to classes of applications. (Many application protocols are sufficiently simple that they utilize very few of the data transfer functions.) The primary function of data transfer protocols required by applications is a common address header. However, other applications do utilize more of the data transfer functionality. For example, relaying may be utilized by protocols, such as mail; multiplexing by protocols such as http or OL TP where re-use of lower layer connections is important; or re-transmission and flow control may be used for one and two phase commit The Applicant has discovered that given the flexibility that separating mechanism and policy gives to a protocol, that only two data transfer protocols are ever needed: a relaying protocol and an error control protocol. But there are circumstances when engineering constraints require the PCI elements to be different sizes. At low bandwidth, large sequence numbers add too much overhead to the PCI and are unnecessary. At very high bandwidth, even longer sequence numbers might be required. A self-describing syntax, i.e. tag-length-value, would incur too much overhead for protocols operating in such performance-sensitive environments and such flexibility is not required at execution time in data transfer protocols. One could have the "same protocol" i.e. procedures but a small number (3 or 4) different PCI formats. These PCI formats would be very similar, only the lengths of the PCI elements would be somewhat different. This can be accommodated by using an abstract and concrete syntax in accordance with the invention.

The concept of abstract and concrete syntax was developed for applications where complex syntax issues are common. These concepts have not been previously applied to data transfer protocols. For now, it is sufficient to provide basic definitions of abstract and concrete syntax. An abstract syntax is a syntax description language that indicates the type and layout of a message, but does specify how it is encoded. The concrete syntax provides the specific encoding rules. There may be many sets of encoding rules for a single abstract syntax, each optimized for a different set of constraints, e.g. minimal bandwidth, minimal processing, etc. The distinction is precisely the same as that between a program written in some (abstract syntax) language and the code (concrete syntax) generated by the compiler for that language. By decoupling the concrete syntax from the abstract syntax, it is possible to define a protocol independent of a specific encoding, or in the case above, define a protocol with more than one concrete syntax for different environments.

By combining the separation of mechanism and policy with the abstract/concrete syntax capability, it is possible to define two protocols either in the first or second form that can be used for all data transfer protocols and for all application protocols.

1.6. Data Transfer Protocol Machines in Accordance with the Invention

In one practice of the invention, a protocol machine may consist of actions associated with inputs, either from PDUs or from the upper or lower interfaces whose sequencing may be controlled by a state machine. The distinction in the types of mechanisms and protocols allows us to say more about the architectural structure of the protocol machines for data transfer protocols. Actions may be divided between mechanism and policy. Further, the distinctions described here in the mechanisms are not just a nice taxonomy but have implications for implementation. Clearly, some mechanisms must be done before others. For example, the CRC must be done before anything else in the PDU is looked at; lost and duplicate detection must be done before acknowledgements, etc. The following discussion sets aside, for the moment, typical engineering constraints and the constraints of serial processors, to instead consider the amount of asynchrony inherent in a Data Transfer Protocol (see FIG. 6).

Referring again to FIG. 6, if loosely bound mechanisms are separated to the right and tightly bound mechanisms to the left, an interesting structure emerges. The left side consists of the flow of the Transfer PDU and consists only of fragmentation/reassembly (609), ordering (611), and queuing (603, 604). The right side handles synchronization (615), flow control (613) and re-transmission control (614). CRC checking (621) and delimiting (622) may be done in common to all PDUs. The left side has little policy associated with it, other than whether simple ordering is on or off. The right side is all policy. The right side maintains the state vector and executes the policies for acking and flow control. The right side requires general-purpose calculations; while the left side does not, just straightforward queuing and ordering algorithms.

The two sides are not very tightly linked. The only effect the right side may have on the left is to start and stop queues and infrequently request that one or more PDUs be dropped from a queue. Furthermore, no assumptions are made about the protocol other than that the mechanisms it should contain. This yields FIG. 6. A design implied by this diagram would support either a protocol with either an in-band or out-of-band design simply by mapping the left and right side to the same or different output queues. It also would allow re-transmission and flow control to be completely asynchronous from the data transfer. Protocol processing has generally been seen as serial in nature; an implementation of this architecture would exhibit a high degree of parallelism, which would greatly enhance performance. This architecture could be pipelined and points to significant improvements in protocol performance.

In accordance with the invention, an optimal protocol design to take advantage of this should separate PDUs for the loosely coupled mechanisms which would be processed by the right side and a Transfer PDU that was processed by the left side. This would maximize the parallelism in the processing and the parallelism in the interactions with the remote PM. There has been a school of thought that tried to minimize the number of PDU types. This was based on assumptions unique to software and hardware constraints and traffic characteristics of the 1970s. A single PDU type simplified processing and allowed acks to be piggybacked with the return traffic. This additional overhead just to carry a 16 or 32 bit sequence number was rightfully considered excessive. However, from the discoveries divulged here, there is no multiplexing in an error control protocol so such overhead is virtually non-existent and the other conditions that were advantageous to piggy-backing ack no longer exist. Concatenated Transfer and Ack PDUs would only have the addresses added once to the pair by the relaying protocol.

The fundamental structures of this approach applies to relaying protocols as well. Two embodiments are offered by way of example, as follows:

First Embodiment

Figure 7:
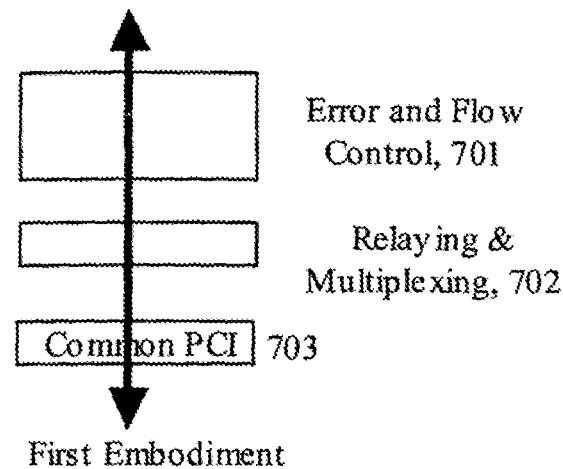
FIG. 7 is a schematic diagram depicting one embodiment, in accordance with the present invention, of data transfer protocols.

The embodiment shown in FIG. 7 allocates the mechanisms between the error control and relaying protocols in a form that closely parallels the placement of functions found in protocols like TCP and IP, or TP4 and CLNP, or XNS. The common PCI, 703, provides the PCI elements common to all PDUs. Relaying and multiplexing, 702, is performed followed by the error and flow control, 701, on a per flow basis.

Second Embodiment

Figure 8:
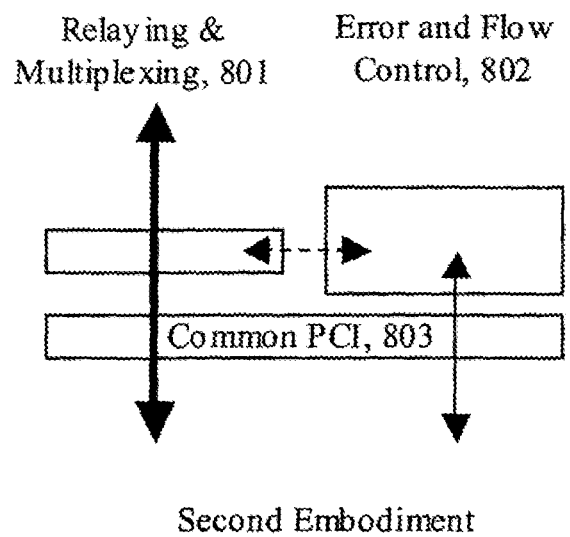
FIG. 8 is a schematic diagram depicting another embodiment, in accordance with the present invention, that allocates tightly bound mechanisms to the relaying and multiplexing protocol and loosely-bound mechanisms to the error and flow control protocols.

The embodiment shown in FIG. 8, however, allocates tightly-bound mechanisms to the relaying and multiplexing protocol, 802, and loosely bound mechanisms to the error and flow control protocol, 801. This also implies that the relaying and multiplexing protocol only requires a 2-way handshake any state synchronization while the error and flow control protocol requires a 3-way handshake. The common PCI, 803, provides the PCI elements common to all PDUs. In this embodiment, the relaying and multiplexing protocol is the primary vehicle for data transfer with the error and flow control protocol being out-of-band. An Application protocol is a specialization of the relaying and multiplexing protocol with additional functions in the data transfer phase. The error and flow control protocol would only be present for application protocols only if one or two phase commits was required.

These embodiments apply only to the implementation and are fully and completely equivalent in their capabilities and the services provided. The PDU formats for the two embodiments could be the same.

II. Topological Addressing

Aspects of the invention utilizing Topological Addressing will next be described in connection with FIGS. 9, 10, 11 and 12. First, however, we provide a background discussion of addressing.

1.1. Names and Addresses

In conventional network practice, there are essentially two approaches to names: denotation and connotation. In natural language, the assignment of names is connotative. Words or names acquire their meaning from their usage. Names are essentially labels on objects. This implies that any arbitrary label can be applied to any object. In particular:

A name space, NS, is a set {N} of names from which all names for a given collection of objects are taken. A name may be bound to one and only one object at a time.

A name is a unique string, N, in some alphabet, A, that unambiguously denotes some object or denotes a statement in some language, L. The statements in L are constructed using the alphabet, A.

Any name, n E N, may be either bound to an object or unbound thus available 20 for binding. An unbound name is called a free name. Names from a given name space may be bound to so-called atomic objects, to other names from this name space, or to sets of objects or names within this scope. One or more names may be bound to the same object. Such names are called aliases or synonyms.

There are fundamental two operations (and their inverses) associated with managing names: creation/deletion and binding/unbinding.

Creation creates a name in a name space. Deletion removes it from the name space. This may be a somewhat philosophical distinction since often the definition of the name space in essence creates all of the possible names. Hence, we will assume that here creation makes names available to be bound. This allows a name space to defined and certain portions of it to be "reserved" and not available for binding.

Binding binds a name to an object. Once a bound, any reference to the name accesses the object. Unbinding breaks the binding. Once unbound, any reference will not access any object. Since names can be re-assigned to different objects, it is often advisable that once a binding is broken that the name not be re-assigned for some period of time to avoid errors. The length of time will depend on the use of the name space and in some cases, it may be advantageous for some names that the length of time be zero or nearly so.

The scope of a name or name space is the set of all objects to which it may be applied. This will most often be used in reference to the scope within which a name is unambiguous. Let $A \supseteq B$, if the name, a is unambiguous in the scope of A, then the there is no other bound occurrence of the name a in A. Any reference to a in the context of A will yield the same object. However, there may be an occurrence of a in B where $B \cap A = \emptyset$, such that a reference to a will not yield the same object as a reference to a in the context of A. This a is a different a in a different name space. For example, it may be said that an (N)-address is unambiguous within the scope of the (N) layer. This means that within the (N)-layer no (N)-address will be bound to two objects at the same time. Or conversely, the same address can be assigned to different objects as long as they are in different scopes. When one speaks of the scope of one address space being larger or smaller than another, one is comparing the number of elements in each set, which may have names.

The words "unique" and "unambiguous" are significant here. When we say a name of an object is "unique," it is used to denote that there is one and only one name bound to this object. When we say a name is "unambiguous," it is used to denote that referencing a given name will yield the same result without implying that it is the only name when referenced that will yield this result, i.e. there may be more than one name for an object. Synonyms are allowed. Thus, a name is a unique string in a language. Meaning that there is one and only one string which constitutes that particular name, but it unambiguously denotes an object or statement, since there may be synonyms for these objects or statements. Statements of the form "X uniquely identifies Y" prohibit aliases or synonyms for the object.

It is generally accepted that addresses should be location-dependent (see Shoch or Saltzer). The necessity of distinguishing what is to be accessed from where it is from how to get there is clear. However, distinguishing where from how in a general network is a tough problem. After much consideration, there was a general consensus that addresses should be topologically dependent. However, no one has been able to define what topologically dependent addresses might be. The present invention, as described below, provides a workable definition for topologically dependent addresses.

Using the definitions of topology in the Glossary set for below, one can construct an address space as follows:

An address space, AS, is a name space defined over a set $\{A\}$ of strings, a, in the language, L which is a topological space. Associated with $\{A\}$ is a function, $F:O \rightarrow A$ that maps objects, $o \in O$ to be assigned addresses to addresses, $a \in A$. F is a function of one or more properties of an object which exhibit the appropriate attribute of "nearness." The set $\{A\}$ has a topologically structure to some level of granularity, g. a $\in A$ are addresses.

An address is a topologically significant name, which unambiguously identifies an object.

An address space is a name space with a topology imposed on it. Hence an address is a specialization of a name. While an address is a label for an object just as a name is, the label cannot be chosen entirely arbitrarily. Additional constraints apply. An address space has a structure. There is the additional constraint that the name must be chosen to be topologically significant (to within some degree of granularity). Therefore, there is a structure imposed on the elements of the address space to reflect this topology and assigned according to an algorithm that maps elements of the address space to the objects being named based on where they are.

Figure 9:
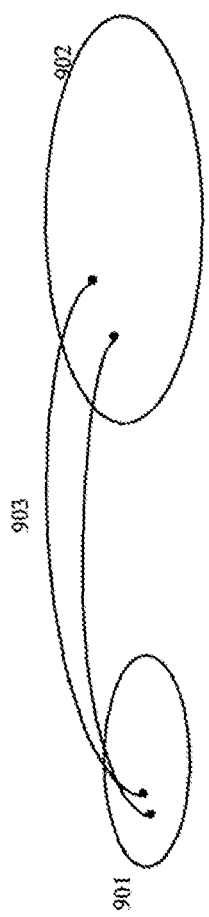
FIG. 9 is a schematic diagram illustrating a topological mapping or homeomorphism.

FIG. 9 illustrates a homeomorphism or a topology between a domain, 901, and a range, 902, which is a continuous function (903) $F:D \rightarrow R$ that is one to one and onto and has a continuous inverse and hence preserves "nearness."

The definition is saying that two points may be near each other in one set and far apart in another, but the distortions maintain the relation of the points to each other. It also can mean that all surfaces with one hole are equivalent or two holes can be equivalent, etc. All of this derives from the definition of homeomorphism (see Glossary). The definition states that there is an onto mapping that from one surface to another without any rips or holes, i.e. it is continuous and there is an inverse.

When one says a network has a certain topology one means that there is a function which is a homeomorphism between the graphs of one or more networks. So in fact, when one says that a network has a certain topology one is saying that there is a set of graphs that maintain certain structural properties in common. One may talk about star topologies, hierarchical topologies, mesh topologies, etc. These all refer to sets of graphs with certain interconnection properties that remain invariant. One may say that two networks have the same topology even if the lengths of the arcs are different but the number of hops between nodes is maintained, etc. However, one must be careful. Often in the literature, "topological" is used when "graph" would be more correct, i.e. the use refers to a single network in isolation, not to a class of networks or graphs.

Addresses are used as an indication of where without indicating how to get there. In other words, one wants addresses to be location dependent without being route dependent. This is desirable because there may be more than one route to a given location and most of the time the choice of how to get there may change much more frequently than where the destination is. In fact, it is advantageous to postpone choosing a route as long as possible. In fact, it would be advantageous to be able to change the route while en route to the destination.

The mapping of addresses to the network reflects where things are for some notion of where. To make it easy for the routing algorithms it is necessary to encode this sense of where in the address without constraining how, so that other things located nearby have similar addresses. This implies that the mapping of identifiers in the address space to the network elements is not arbitrary. In fact, the mapping must define a topology and the address space can be said to have a topological structure.

In accordance with this invention, the granularity, g, of the address space, AS is defined as follows:
Consider two addresses, a and b in A,
if $d(a,b) < g$, then $d(a,b) = e$
as $\lim e \rightarrow 0$ In other words, while a and b are distinguishable, i.e. a not equal b. Referencing a will yield a different object than referencing b. But as far as the topology of the address space is concerned they are in the same place, even though physically they may be a great distance apart (different topology with a different granularity). This property is common in address spaces. For example in the telephone system, numbers within the same exchange exhibit this property. The distance between any two telephone numbers in the same exchange is less than g for that topology.

Two other mathematical properties will prove useful in applying topological addresses to networks: distance and orientation (see Glossary set forth below). When these properties may be used, they represent special types of topologies.

In accordance with this invention, an address space, A, is defined to have an orientation if and only if there exists an order relation R on A that is a partial ordering, which is defined to be reflexive, anti symmetric, and transitive (see Glossary set forth below for related, supporting definitions).

In accordance with this invention, an address space is a set upon which we may impose a topology and in some cases a distance function and/or an orientation. The topology of a oriented address space maps the elements of the address space to the elements of the network which form the graph of this layer. In essence, we create a homeomorphism between the address space and the elements of the graph of the layer, i.e. the connectivity of elements with respect to their layer. The effectiveness of the routing and resource management for the layer can be greatly enhanced if the topology is metrizable and has an orientation. For some applications, it will be useful to consider network addresses as metrizable topologies, but we will want to add the concept of granularity to the concept.

Figure 11:
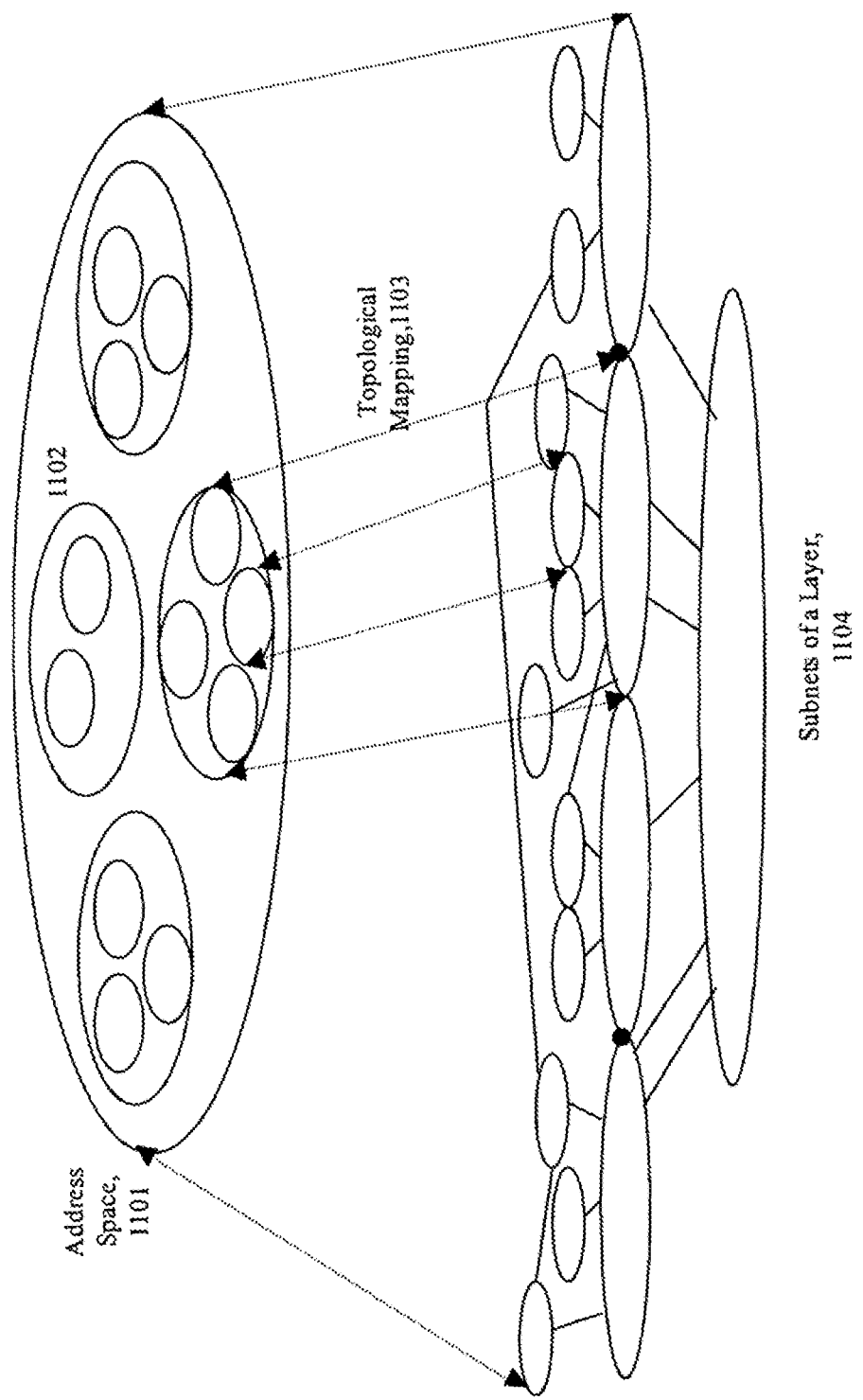
FIG. 11 is a schematic diagram depicting how, in accordance with the invention, a topology or topological mapping can be constructed between address spaces of adjoining layers.

FIG. 11 illustrates this with an address space, 1101, with a relation R, 1102, (giving it an orientation) that imposes a structure on the address space that is mapped by the topology, 1103, to the elements, 1104, of the layer.

Figure 10:
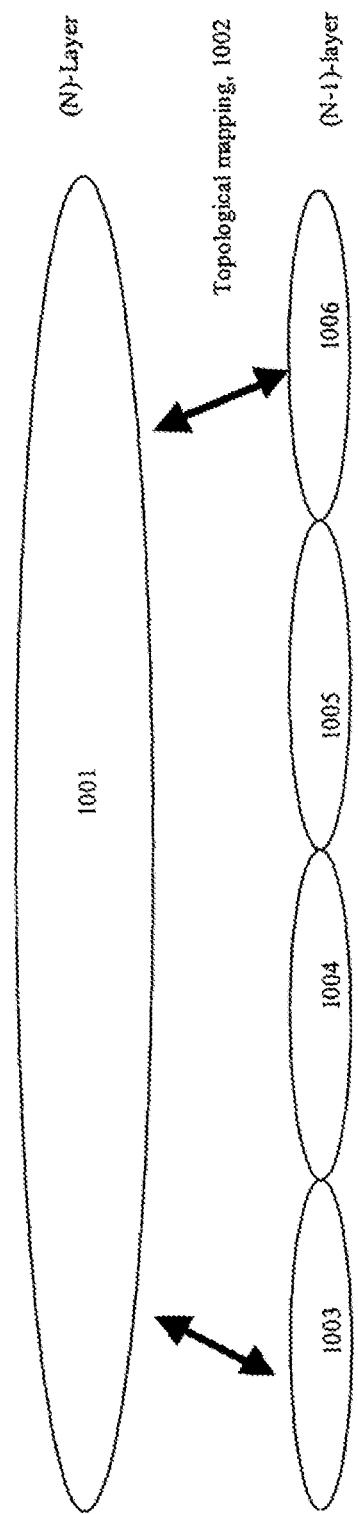
FIG. 10 is a schematic diagram depicting how a topology or topological mapping can be constructed between the elements of an address space and the 30 addressable elements of a layer of a network, in accordance with the present invention.

FIG. 10, in turn, illustrates a topological mapping, 1002, between the addresses of the (N)-layer, 1001, and the (N–I)-layers, 1003 to 1006. The address in the (N)-layer are unambiguous across the entire layer. The addresses in the (N–I)-layer are only unambiguous with their layer. But there are a collection of (N–1)-layers, 1003, 1004, 1005, and 1006, which form a covering of the (N)-layer such that for any network element with entities in both the (N)- and (N–I)-layers there is an (N)- and (N–I)-address for those entities. Note that the connectivity of the (N)-layer and (N–1)-layer will differ from the graph of connections that make up the physical network (unless (N–1) is the physical layer). For the (N)-layer, all (N)-entities are directly connected. For the (N–1)-layer all (N–I)-entities in the same layer (1003, 1004, 1005, and 1006) are directly connected, while entities in different (N–I)-layers communicate via relays in the (N)-layer, giving the (N–1)-layer a graph that is an abstraction of the underlying physical graph. A topological mapping between the addresses in the adjoining layers greatly reduces the overhead in creating a forwarding table.

Similarly, in accordance with the present invention, the topology mapping between the (N)-address space and the collection of (N–I) address spaces will be much more effective if it has similar properties. Note however, that it is not always possible and is even advantageous in some cases that the mapping between an (N)-layer and an (N–1)-layer not be homeomorphic.

Since an address is defined as a topologically dependent name, then there should be a term for the non-topological names.

A title space is a name space.

A title is a topologically-independent name which unambiguously identifies an object or a set of objects.

A title is a specialization of a name. A title is a label for an object and can be chosen entirely arbitrarily. The only constraint is that the chosen string in the address space is not bound to another object. Therefore, there is no structure imposed on the elements of the address space. Such a name space is often referred to as flat.

2. Addressing in Network Architectures

To define addressing in a network architecture, there are five fundamental questions that must be answered:

1) What is named or addressed?
2) What is the scope of the name, i.e. in what range is it unambiguous? Ranges might be the whole network, a subnet, a single host, etc.
3) What properties should these names have? Location-dependence, route dependence, etc. What should be independent or invariant? What is the maximum number of elements in the address space from which the address is taken?
4) What is the structure of the name space or address space applied to things that must be named?
5) What is the procedure by which addresses are assigned (the registration authority)?

The topology of the address space is, in a sense, an abstraction of the topology of the physical network. Below one such topology is described.

3. The Role of Hierarchy in Addressing

In conventional networks, all address architectures for large domains (networks as well as others, such as the postal system, the telephone system, etc.) have utilized hierarchical topologies for everything except the terminal sets of the address space. There has been considerable use of other topologies in these local environments, spatial, Cartesian, flat (enumeration), time, random (another form of enumeration), etc. The small scale allows almost any assignment procedure to be used.

There are three distinct hierarchies in network architectures that are often confused and even combined:

The hierarchy of multiple layers,
The hierarchical topology of a large address space, and
The hierarchical arrangement of subnetworks.

All three affect an addressing architecture. The distinctions among them must be kept clear and if assumptions are made that meld them, they must be clearly made and understood.

3.1. The Hierarchical Topology of Address Spaces

In accordance with this invention, networks with a relatively large scope may have a large number of elements to be assigned from its address space. The management of the address space can be much more manageable if a hierarchy is imposed. The address may consist of a sequence of domain identifiers that correspond to a path through the branches of the hierarchy. This sequence does not specify a route but only a location within the granularity of the address space. A non-terminal domain identifier identifies a set of domains, i.e. a set of sets of addresses. The terminal domains reflect the granularity of the topology. Within the terminal domains, addresses may be assigned in some arbitrary fashion. This does not imply random or simple enumeration for assignment, although it may be either. Put simply this implies that the assignment of values in the terminal domain is not necessarily topological. The points are distinguishable, but their "distance" is indistinguishable within the topology.

Consider how the basic properties of an address space may be manifested in a hierarchical topology. In this topology, the points are represented by a string of domain identifiers, $(d_n, \ldots, d_1, d_0,)$.

The primary property required is the concept of distance. Above, the granularity of the topology is defined to be the minimum distance between two points that can be distinguished by the distance function. In this topology, the granularity, g, is defined as $d(a, b) < g <=>$
$Va=(a_n, \ldots, a_1, a_0)$ and $b=(b_n, \ldots b_1, b_0)$
$\ni a_i=b_i$ Vi $\ni 1 \leq i \leq n$ In other words, the distance between two addresses in the same leaf domain is indistinguishable in the topology. Let us define the distance between two addresses, a and b to be:

$d(a, b)=2*\Sigma(a_i \neq b_i)$ $1 \leq i \leq n$

This is just one possible distance function. Others are possible and do not affect the outcome of our description. The function measures the depth of the sub-tree to be traversed from a to b and then to get there it is necessary to go up to the first domain in common and then back down, hence *2. This of course is for the easy case where the tree has equal depth on all branches. A somewhat different equation will be necessary for trees with unequal depth.

3.2. The Hierarchical Topology of Networks

Conventionally, networks may be organized into a rough hierarchy of subnets with small feeder subnets connected to regional subnetworks connected a backbone subnetworks. (The term "rough" connotes that the hierarchy is not strictly enforced, since arcs between subtrees are allowed.) The levels of subnets attempt to minimize the number of hops required to deliver a PDU between any source and destination. This desire also moderates the depth of the hierarchy. This sort of tree may on average minimize the number of hops between any two points. However, the inefficiency of strictly following a hierarchical topology for routing is well known, especially for "local traffic" or traffic between "popular" sites with a network. Hence, networks occurring naturally are seldom strict hierarchies. Additional arcs may often be added to "shortcircuit" the path between branches of the tree with a considerable traffic. Peering points may be used to short-circuit the hierarchy and to further optimize the route between points with lots of traffic.

The number of levels in this hierarchy may also vary depending on the media and bandwidths involved as well as the number of organizations. For example, one feeder subnet might be a small corporation with several subnets; or a local ISP with residential or corporate customers with their own subnets, etc. Some networks such as the public Internet are not rooted in a single subnet, nor are the connections between subnets strictly hierarchical. The hierarchy is imposed as the minimal (or default) connectivity of the subnets, although not necessarily the primary or minimal connectivity. The tree is the minimal connectivity that a router needs to know. The links that make the connectivity a lattice can be considered elements of alternative subnet hierarchies, i.e. tunnels or "short cuts." Also, user systems may not be attached only to "leaf" subnets, but to whatever subnet is closest to the user's system physically.

While the address architecture is ultimately concerned with finding a route from the source to the destination, the address itself must limit its role to locating the addressable element. This may be made much easier if it is possible to recognize and use the hierarchy of subnets in the assignment of addresses. Clearly, a near optimal path would be to route up toward the backbone (unless a short-cut is encountered) and then back down the tree. The obvious approach would be for the hierarchy of the address space to correspond in some way to the hierarchy of subnets. However, the correspondence cannot be too close, since physical network topology tends to change. The address space is supposed to be dependent on location but independent of route. Thus, while an address space should recognize the hierarchy of subnets, it should not be too tightly bound to its connectivity.

3.3. Melding the Hierarchy of Address Spaces and the Hierarchy of Layers

Network architectures may be organized into a hierarchical stack of layers. Lower layers in this hierarchy have smaller scope and in general scope increases as one moves up through the layers. This forms the equivalent of a tree with many more leaves (bottom layers) than branches.

These layers allow efficiencies in routing and resource allocation to be achieved. This structure would seem to coincide well with the subnet structure just discussed and at the lower layers it may. Thus, the amount of PCI overhead that must be carried should decrease with the lower layers which will also reduce the complexity of the routing tasks, i.e. fewer routing decisions on fewer flows requiring less routing computation and routing traffic. Addresses at different layers will exhibit a hierarchical structure if the scope of the layer is sufficiently large that it facilitates the management of the address space.

In accordance with one practice of the invention, address spaces are finite point sets. Networks are finite graphs. An address space of a (N)-Layer can impose a topology on this point set that represents an abstraction of the network graph as seen at that particular layer. The topology of an address space and the topology of the network are distinct and separate. The topology of a (N)-layer as seen from above the (N)-layer boundary, i.e. by its user, is a fully connected graph, i.e. directly connected. Each node, i.e. (N+1)-PM, is one arc from every other node. The (N+1)-PMs appear one hop from each other at this layer.

In accordance with a further practice of the present invention, the topology of the (N)-layer as seen just below the (N)-layer boundary is an (N)-network consisting of 5 the collection of (N−I)-layers which form a covering of the (N)-layer and the (N)-relays providing the connectivity among the (N−I)-layers (or subnets). Thus, the (N)-network consists of all nodes in the (N)-layer, i.e. hosts and relays, and arcs connecting those nodes, i.e. (N−I)-layers. The end-nodes of the (N)-network are directly connected to one or more (N)-relays, i.e. they are one hop across an (N−I)-subnet from one or more (N)-relays. k (N−I)-layers are required to cover the (N)-network, i.e. support the scope of the (N)-layer. To be less abstract for a moment, a (N)-network looks like a WAN connecting a set of LANs. As one goes down through the layers the "WAN" gets larger and the "LANs" get smaller.

In accordance with the present invention, there is a "covering" of layer (N) if and only if at least every (N)-layer relay has a binding with the (N−I)-layer, i.e. a binding between an (N)-relay and a (N−I)-PM in the same system. A covering does not require every (N)-PM to have an (N−I)-PM. In particular, an (N)-PM that is not an (N) relay may not have such a binding. The (N−I)-layers as seen by the (N)-layer are fully connected. The connectivity formed by the (N)-relays forms a graph that covers the (N)-layer. This can be viewed as an abstraction of the underlying physical network. This abstraction is refined (made less and less abstract) down through the layers until the topology of the (N)-network is isomorphic to the physical graph of the network.

Also in accord with the invention, moving from top to bottom, the layering decomposes the connectivity and resource allocation problems into more manageable pieces by creating a covering of (N−I)-layers. The layers between the "top" and "bottom" may be created as a combination of abstracting the physical network graph and aggregating the flows of the layer(s) above. The higher the layer the more aggregation dominates; the lower, the more the physical network dominates. At some layer, the connectivity of the layer, i.e. its graph, becomes isomorphic with the graph of the network, ultimately at the physical layer. The graph created at layer (N) represents the connectivity at this level of abstraction.

The binding between the elements of the point set topology formed by the (N) layer address space (which are location dependent; route independent) and the topology of the (N)-network (which is route dependent relative to the (N)-layer) is the basis for routing. Maintaining this mapping is the directory/routing function.

The address space at layer (N) is larger than the address space at layer (N−1) owing to the smaller scope of the underlying layer.

Successively lower layers contain fewer elements than the layers above. (Lesser scope implies fewer elements reachable within a layer and therefore shorter addresses.)

There must be a mapping between the (N)-addresses and the (N+1)-addresses for the network to be able to route messages from the source to the destination. These mappings should be easy to compute and maintain. Based on what has gone before the following observation can be made:

In accordance with a practice of this invention, the function that maps (N)addresses to (N−1)-addresses in any network architecture should be a homeomorphism with two and half exceptions:

1) Mappings from application addresses to (N)-addresses may not be homeomorphic by design. The topology of application addressing serves a different location independent purpose than (N)-addresses that are location dependent.

2) For (N)-layers with a scope that is sufficiently small, i.e. smaller than the granularity of typical address spaces, there are few enough elements that the address space need not be topologically-dependent.

3) There may be a discontinuity in the mapping between layers belonging to different domains, such as a layer belonging to the public addressing domain, enterprise or extranet and a provider or from one provider to another. This mapping mayor may not be a homeomorphism.

So, addresses at the top and bottom are not required to be location-dependent. But could be. For media with physical layer addresses that may be assigned at installation, it may be possible to make even this last mapping homeomorphic.

A hierarchical address space is commonly used as much to facilitate the management of address assignment as it is to be a useful addressing topology. Each layer may have a distinct and independent address space. If the scope of the layer is large enough, it may have a hierarchical address space imposed on it. The hierarchy breaks up the address space into manageable pieces with various levels having their own sub-authorities for allocating sub-trees. Each non-terminal level of the tree defines 5 a set or domain that may be administered independently.

The choice of domains is not entirely arbitrary, although there is considerable flexibility in choosing them and choosing well is highly desirable. In general, these domains should correspond to geographical regions, spatial loci of organizational facilities, subnetworks, etc. Although, they should not be along organizational lines that do not correspond with some form of spatial locality, i.e. members of a department spread through multiple buildings would probably not be a good domain. While the choice does not directly reflect the connectivity of the network, it is important to recognize that things near each other may be connected by a single subnet. It is possible to define an addressing architecture for an organization of layers that is simple to maintain.

4. Addressing Architecture

The assignment of addresses should facilitate finding the location of the PMs addressed to the greatest degree possible The only topology that has been found to scale for a wide range of size, granularity, and other properties is a hierarchy. It would seem fortuitous then that the seemingly preferred organization of physical networks is roughly a hierarchy with "short-cuts" added between sub-trees; and the design of the address space may loosely coincide with the hierarchy of subnets. Locating should remain independent of routing. The physical connectivity represented by the subnet structure is subject to change. And while we recognize that this change will affect addressing, experience has shown that it is not wise to tie the addressing structure too tightly to the physical structure. A separation of logical and physical is needed. This is the role that layering has traditionally performed. Layers close to the physical media closely reflect the characteristics of the media. While successively higher layers provide greater and greater abstraction, i.e. are more logical than physical.

Thus, we construct a hierarchical address space that reflects the "ideal" subnet hierarchy. Addresses then would be assigned to reflect that ideal structure even if the physical reality diverges somewhat. This may lead to occasional re-assignment of addresses, but even then it would be rare if such a change would alter an addressable element's position in the hierarchy by more than a single level.

4.1. (N)-Layer Address Space

As one practice of this invention, hierarchical topologies are the only ones that seem to work on a large scale. A globally unambiguous address is constructed from a hierarchy of domain identifiers, where n is the maximum depth of the hierarchy. Therefore, a (N)-address can be represented by the tuple $(d_n, \ldots, d_1, d_0,)$ where the $d_1$ are domain identifiers. In particular.

$d_0$=instance, or the shared state for a single flow or connection $d_1$=entity or protocol machine, which may have several flows $d_2$ subnet or domain (in many, but not all cases this will correspond to a system)

An address space for a layer M≤N may, in general, have an equal or fewer number of addressable elements.

The minimal address space consists of $(d_1, d_0)$. This is the non-topological part of the address. To relate this to concepts discussed above:

$d_1$=(N)-address (the rPM) and $d_0$=(N)-address-suffix (the ePM).

As the size of domains decreases, for some number of elements, a hierarchy becomes cumbersome. For these "smaller" address spaces, it is usually the case that an arbitrary topology may be assumed. In essence, "locally everyone knows where everyone else is." If another topology is used, it is a local matter. It can be assumed that this will be the case for $(d_1, d_0)$.

The easiest such address space to describe (and implement) consists of addresses, which are strings of fixed length domain identifiers. For this discussion it will be assumed, this is the case. This is done not just for the sake of simplifying the discussion, but also because this approach combines the best attributes of both fixed and variable length address formats. If the relaying PM knows what domain level it is working on (and it can), it is able to treat this variable length address as being fixed length.

For many environments where most traffic is "local," it may be useful to allow a local form of address which would consist of a "level indicator" and a partial address. The value of the level indicator means that the first i domain identifiers (from the left) are the same in the source and destination addresses. The string used in PCI to represent the source and destination addresses, $((S_n, \ldots, S_1, S_0), (d_n, \ldots, d_1, d_0))$ would then be $(I, (S_{i+1}, \ldots, S_1, S_0), (d_{i+1}, \ldots, d_1, d_0))$.

where i<n.

Or in the worst case, $(0, (S_n, \ldots, S_1, S_0), (d_n, \ldots, d_1, d_0))$

This would greatly reduce protocol overhead for local traffic. A useful form would be:

$(n-2, (S_1, S_0), (d_1, d_0))$ 4.2. Data Transfer Address Architecture

While the domain structure can be arbitrary and independent of the lower layers, routing will be facilitated the more the topology of the address space reflects the topology (but not necessarily the connectivity) of the network.

The higher the layer the more abstract the topology, the lower the layer the more it reflects the actual network. Thus, an address space topology may be constructed that takes advantage this property. For purposes of this description, it is assumed a one to one correspondence between domain identifiers and layers. This constraint is purely to help clarify the discussion and can be relaxed to allow multiple domain identifiers per layer (and undoubtedly would be in practice).

An (N)-network consists of an (N)-layer and its supporting layers. The elements of an (N)-layer are addressed by an (N)-address=$(d_n, \ldots, d_1, d_0)$. The connectivity of the (N)-network below the layer boundary will consist of a set of (N)-relays and a set of (N–I)-layers or (N–I)-networks, often referred to as subnets, that provide a covering of the (N)-layer. Thus, the topology of an (N)-network is the topology of the direct connections among the (N)-relays and the (N–I)-layer clouds.

Let us assume that there are $[d_n]$ (N–I)-networks, where $[d_n]$ is the number of arcs from the do node of the addressing tree. If it is assumed our fixed domain-id fields are r bits in length, then $[d_n]=2^r-1$.

Similarly, there are at most $[d_n] \cdot [d_{n-1}] \cdot \ldots \cdot$ (N–2)-networks, etc.

The (N)-address can name $[d_n] \cdot [d_{n-1}] \cdot \ldots \cdot [d_1]$ (N)-entities.

The (N–1)-address can name $[d_{n-1}] \cdot \ldots \cdot [d_1]$ (N)-entities

After carefully distinguishing the three hierarchies involved in addressing, it is useful to purposely confuse them to our advantage.

The domain-ids for each of the addressing hierarchies for the (N)- and (N–1)-layers can all be drawn completely independent of each other or not. However, some efficiency in fewer stored routes and faster look-ups can be gained if some relation exists.

Consider the following useful convention for addressing by re-writing an (N)-address as follows:

$(x_N, \ldots x_2, (x_1, x_0))$

Alternatively, suppose that the (N–I)-layers were given addresses by the following convention:

$(X_{N-1}, \ldots X_2, (y_1, y_0))$ where the $y_1$'s are the local identifier for the (N–1)-entities and the $y_i$'s are the same as in the (N)-address, or in general, the (N)-address of the (N–i)-layer will be $(X_{N-i}, \ldots X_2, (y_1, y_0))$ The Xi for the (N–i)-layer for j=N–1 to 0 can be the same as the $x_1$ for addresses for the (N–i)-layer for j=N–i to 0.

Ultimately, the backbone of the network would be: $(x_2, (y_1, y_0))$.

This does not imply that there must be as many layers as domain identifiers. Contiguous substrings of initial $d_i$ can be treated as a single subnet with a hierarchical address space, while a terminal substring of $d_i$ can be treated as a single domain. Nor does this imply a single hierarchy.

A real global network would not be quite so "ideal." In practice, the kind of address architecture one might expect to evolve could be described as a large table:

The tabletop would be formed by a small number of layers (probably between and 1 or 3) of global address space. These would be provider-independent addresses for all network elements in a global Internet. The address spaces should be designed as if they were the only address spaces in the network, consisting of a hierarchy of regional subnets that would go all the way down to a single global backbone.

However, they would only be used for a small number of layers at which point there would be a discontinuity in the mapping between address spaces at the transition between the top of the table and the table legs.

The legs of the table are formed by the major backbone providers which have multiple layers of provider-dependent address spaces. If viewed geographically these "table legs" will undoubtedly overlap. Backbone providers would manage their address space assigning large sub-trees to downstream providers and large customers. A change of providers might only modify the position in the tree and not a complete renumbering. Depending on the nature of the downstream provider it may be represented in the provider-dependent address space as a separate layer or as a separate subnet.

There may be "braces" between the legs of the table that correspond to the peering points between providers and other short cuts in the routing structure. These "braces" may be "horizontal," i.e., between different providers at the same levels of their hierarchy or "diagonal" between different levels. (Note that these are differences in the routing hierarchy of the same layer, not different layers.)

Each layer's address space provides a further level of abstraction from the physical network that give providers considerable flexibility in configuring their actual network. The address spaces project a logical view to the outside world that makes it easier for 20 the outside world to think about the routing capability of a provider while hiding the details of how the provider actually performs the logical illusion.

5. Complex Uses of Addressing 5.1. Generic Titles/Addresses

A Generic Title or Address is an unambiguous name for a set of addresses such that when the generic title or address is referenced one element of the set is selected. Associated with each generic Address is a procedure, which defines how an address is selected from the set. The set may be a set of primitive addresses in the same system, the same domain, parent domain, etc. This information must be distributed to other (N)-subsystems, which would have to interpret the address. A restricted form of this is called an anycast address. A normal unicast connection request is a degenerate form of generic address (do, •••, db *) that will accept any instance.

The amount of topology that can be reflected in the assignment of a generic address will depend on the elements of the set. The generic address will contain the maximum common topological information of the addresses of all of the elements of the set. Mappings of generic addresses will in general not be homeomorphisms because the inverse function does not exist.

5.2. Group Titles/Addresses 5.2.1. Multicast Address Architecture

The Applicant has observed that a multicast group at layer N, (N)-G, is defined as a set of addresses, $\{(N)-A_i\}$, such that a reference to (N)-G by a member of the group yields all other elements of $\{(N)\text{-}A_i\}$. (Some multicast models do not require the sender to be a member of the group. However, in substantially any form of production multicast service, such a relaxed approach is not possible.) It is sometimes useful to consider traditional "unicast" data transfer as a multicast group of 2. (N)-G is identified by an (N)-group-address, (N)-GA.

(N)-Group Address=$\forall$(N)-$A_i \ni$ (N)-$A_i \epsilon G=\{(N)\text{-}A_i\}$.

The order of a (N)-G, i.e. the number of elements in the set, is $|\{(N)\text{-}A_i\}|$ or $|(N)\text{-}G|$. While there is no logical reason that the set cannot contain a group address, there are practical reasons to be cautious about doing so. For example, in networks that do not address to the granularity of instances or flows, if a group address occurs in the set of another group address that the sets have no common members. Otherwise, some members will get multiple copies of PDUs and preventing it will be cumbersome. However, if the architecture does address the finer granularity, there is no difficulty since duplicate addresses simply fallout as degenerate cases.

The primary purpose of multicast is to improve bandwidth efficiency for those applications that require the same data be delivered to a number of addresses. Several mechanisms are used to accomplish this ranging from brute force flooding to the more subtle forms of spanning trees that minimize the amount of data sent. These spanning trees may be rooted at the sender(s) or at some intermediate point, sometimes referred to as the "center of gravity" or "core" of the group.

A minimal spanning tree is an acyclic graph $T(n, a)$ consisting of n nodes and a arcs imposed on a more general graph of the network. This tree represents the minimal number of arcs required to connect (or span) all members of (N)-G. The leaf or terminal nodes of the tree are the elements of the set $\{(N)\text{-}A_i\}$. The non-terminal nodes are intermediate relays in the (N)-layer. Let us designate such a spanning tree for the group, 0 as TG(n,a), the Applicant has observed that min $|T_G(n,a)|=|\{(N)\text{-}A_i\}|$ max $|T_G(n,a)|=|\{(N)\text{-}A_i\}|+(d-1)|\{(N)\text{-}A_i\}|$ where d=diameter of the network.

Let (N)-B be a group address and (N)-Ai be the addresses in the group, then $\exists$ a spanning tree, (N)-$T_B(A_i, c_i)$ which covers (N)-B, $\forall$ (N)-$A_i \ni$ (N)-B, (N−1)-$A_i \ni \Phi$:(N)-$A_i \rightarrow$(N−1) $A_i$ and (N−1)-$A_i \epsilon$ (N−1)-$G_i$.

Or, some elements of (N)-B such that (N)-$A_i$ is bound to (N−1)-$A_i$. This binding creates a group at layer (N−1) in each of these subnets. In current networks, F is 1:1, $\forall A_i$.

$\forall$ (N−1)-$A_i \exists$ subnets, $S_i \ni$ (N−1)-$A_i \ni \Sigma_1$

If $|(N-1)\text{-}G|=k$, then $\exists$ m $S_i \forall$ (N−1)-$A_i \epsilon$ (N−1)-G, m$\leq$k To the user of layer N there is one "subnet," a user of layer (N) appears directly connected to all other users of that layer. From within the (N)-layer, there are m subnets connected by the (N)-relays. A subset of these (N)-relays form the non-terminal nodes of the spanning tree, (N)-T(Aj, Ci). Thus, there are k addresses that 30 belong to m subsets with m$\leq$k. This decomposes the (N)-$T_B(A_i, c_i)$ into m (N−1) $T_B(A_i, c_i)$.

Let $\{(N-1)\text{-}A_i\}_j$ be the (N−1)-$G_j$ of addresses in subnet $S_j$.

At the m (N−1)-layers, $\exists$ (N−1)-$G_j \ni \{(N-1)\text{-}A_i\}_j$.

(N)-GA is supported by the services of the (N−1)-layers (subnets) which form a covering of the (N)-layer. A subset of this covering provides services in two distinct ways:

1) the p end subnets, $G^e_j, \{(N-1)\text{-}A_i\}_j$
2) the m−p transit subnets, $G^t_j$, that connect the p end subnets.

Figure 12:
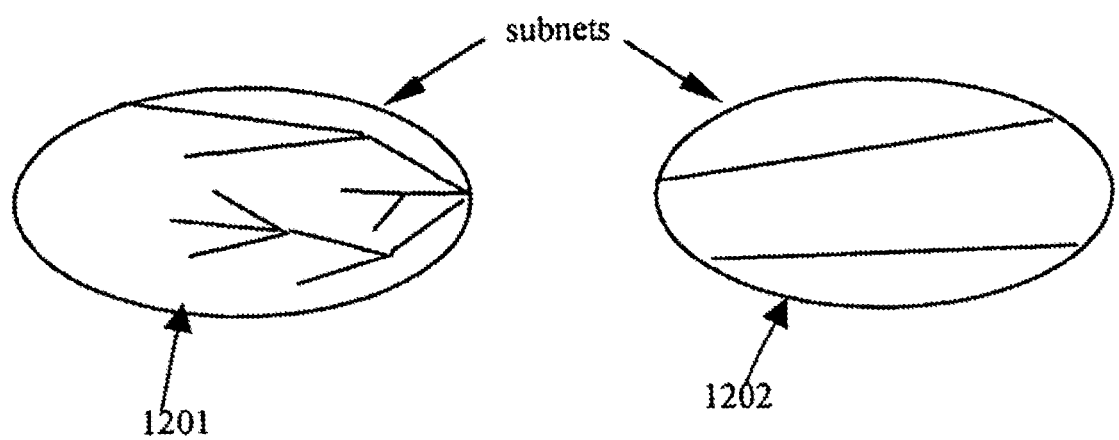
FIG. 12 is a schematic diagram depicting a transit subnet and a leaf subnet for a multicast group.

The spanning tree of the end subnets would be rooted at a border relay at which it enters the subnet. The (N)-GA is supported by p (N−1)-$G^e$ and (m−p) $G^{t \bullet}$ FIG. 12 shows a typical leaf subnet 1201 and a typical transit subnet 1202. This decomposition of multicast groups occurs naturally as one moves to lower layers. Intermediate subnets may also have some branching but would typically be much simpler than the branching in a leaf subnet.

Note there may be more than one such entry point and thus more than one independent spanning tree for the same group in the same subnet.

As one moves down through the layers, the number of end subnets decreases, the degree of branching decreases, and the number of transit subnets increases.

5.2.2. Multiplexing Multicast Groups.

The Applicant has observed that multicast has always been considered such a hard problem that multiplexing multicast groups for greater efficiency was just too much to consider. But given an approach that allows us to decompose the problem, multiplexing becomes fairly straightforward. There are two cases that must be considered: transit groups and end groups.

Assume layer N has m subnets. Any group from layer (N+1) will be decomposed into n segments n$\leq$m consisting of p end groups and q transit groups, n=p+q. Suppose there are k such groups at the (N+1)-layer, each with its own value of n, p, and q.

The number of subnets may be much smaller than the number of hosts participating in the group as is the number of (N)-relays. Therefore, it is likely that there will be a number of transit groups that have flows between the same (N)-relays. These are candidates for multiplexing.

A transit group is distinguished by connecting only (N)-relays. A transit subnet group consists of q pair-wise connections, where 1$\leq$q$\leq$m. The decision to multiplex them will be no different than for any other unicast flow.

An end group is rooted at (N)-relay and leaf nodes are either end systems or other (N)-relays. Multiplexing the spanning trees of the end groups is more difficult. One could require that the trees be the same, but this would not lead to many opportunities to multiplex. It would be better to allow similar trees to be multiplexed.

Here there are a number of spanning trees rooted at the same (N)-relay. To multiplex, it is desirable for (N)-$G_e$ to be similar if not the same trees. Let us define 1-similarity, as 1 is the number of leaf nodes of the $G_1, \ldots, G_k$ have in common. Suppose $G_1, \ldots, G_k$ be the end groups of an (N)-subnet of distinct (N+1)-groups, then $\forall G_i \epsilon G_1, \ldots G_k < 1$ then $G_1$ may be multiplexed.

Then construct a spanning tree for $\cup G_1, \ldots, G_k$. This will cause some PDUs to be delivered to addresses, which are not members of the group and will be discarded. (Other QoS parameters may cause Gi to be multiplexed with a different (N)-$G_i$.)

5.3. Mobile Addresses

There are basically two forms of mobile addressing that must be considered: the tethered case, where a mobile end-system or subnet communicates with a fixed subnet; and the un-tethered case, where a mobile end-system or subnet communicates with other mobile end-systems or subnets. Mobile addressing is concerned primarily with the very lower layers, what was traditionally called the Data Link Layer. In a more general architecture this will only impact the lowest few layers, above that the issues addressing degenerate to either the static case or the tethered case.

The Applicant has observes that mobile addresses are not really another form of address. Addresses used in mobile systems are just like any other. There is no need to distinguish them from other forms of address or even treat them differently. The only distinguishing characteristic of an (N)-address of a mobile system is that its binding to the (N−1)-address may change a bit more frequently. Why does the binding change? Because its point of attachment to the network changes. To maintain the topological significance of the addresses assigned to the system. Small changes in position (within the range of the granularity of the address space for that layer) would require no change to the address at that layer. But that same change in position may be much larger than the granularity of a lower layer and require the lower layer address to change. The further the system moves the higher in the layers the changes in addressing until ultimately the address of the "top" Data Transfer Layer will change. However, the application address of an application on a mobile system need never change.

Will there be a problem with propagating these changes in address throughout the network? The Applicant has found that there is no problem because the change only needs to be propagated to other routers within the (N–I)-layer. The change does not need to be reflected in the (N)-layer (yet) because the (N)-layer is still topologically significant. The lower the layer the greater the rate at which the binding will change. The higher the layer the slower the rate of change. This is a direct consequence of the larger scope of higher layers. Changes will be the greatest in those layers with the smallest scope and where the time for the propagation of updates will be the shortest.

Figure 13:
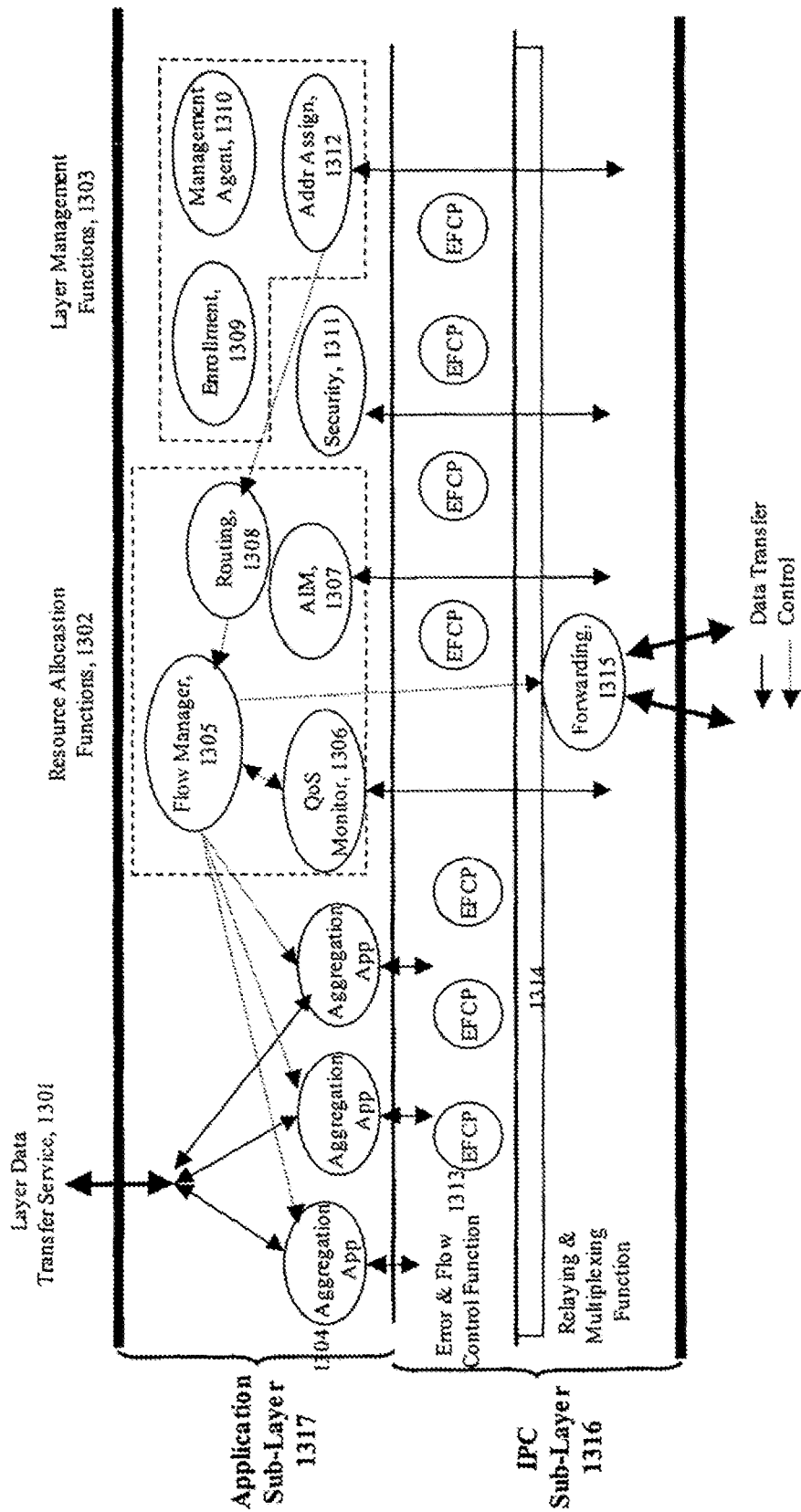
FIG. 13 is a schematic diagram depicting the elements of a fully operational layer subsystem.

Having set forth the inventive aspects of (I.) network protocols with invariant structure and (II.) topological addressing, we next turn to a description of a recursive structure in accordance with the invention, which can advantageously utilize both of the foregoing aspects, all with reference to FIG. 13 et seq.

The following discussion describes the components and operation of a recursive layer in accordance with the invention, as shown in FIG. 13. In particular, FIG. 13 depicts the elements of a fully operational layer subsystem. In order to be useful, a system supporting network communication must also support a collection of applications and protocols for each layer. As shown in FIG. 13, the layer is subdivided into what are effectively two sub-layers: the applications and interprocess communication (IPC). This collection is collectively described herein as a layer subsystem or, more simply, a subsystem (i.e., the entirety of FIG. 13). A layer subsystem comprises all functions required by a system to participate in the operation of a given layer. In turn, a system may have one or more layer subsystems for layers of different ranks.

For both the applications and the interprocess communications, an important characteristic is the ability to separate mechanism and policy, so that the same fundamental mechanisms can be used to cover a wide operating range. This is especially important for the data transfer protocols used in interprocess communication, especially those that operate close to the user applications, where operating characteristics vary the most. The mechanisms for the data transfer protocols are fairly limited and can be bounded. The embedded applications and their mechanisms may show more variability. Here we describe one functional breakdown of the components of a layer. While all of these functions exist in a layer, as described herein for some forms of layers some of these functions may be simpler or exist as degenerate cases. Furthermore, specific implementation strategies may choose to combine them or further decompose them in different but equivalent ways. These implementation strategies are all equivalent and perform the basic functions described here.

Referring again to FIG. 13, these functions can be sub-layered into an interprocess communication sublayer 1316, consisting of relaying and multiplexing protocol machines 1314, error and flow control protocol machines 1313 and a forwarding engine 1315. An application sub-layer 1317 consisting of four collections of applications to support aggregation or user applications 1304, resource allocation 1302, and layer management 1303, and security, 1311. The application need only be concerned with communicating its own initialization information with its peer. This may be included in the initial procedures establishing communications. It is likely that in most systems the embedded applications that communicate with remote peers would all have similar address assignments.

The applications described herein are for expository purposes only. These functions must exist, although they may be combined in different groupings and in some cases some functions may be minimal or non-existent. For example, the applications identified under Resource Management might be implemented as a single process or as fewer or more (further decomposing the problem) than described here. However, the basic functioning would remain the same.

1. The Components of a Layer

The following discussion describes the components of a layer in accordance with the invention. For ease of exposition, these components are grouped into Layer Management, Resource Management, Security and Interprocess Communication. Many of these functions, per se, have been described elsewhere, and forms of them exist in conventional systems, although not necessarily decomposed in the manner of the present invention. In particular, the Applicant has discovered that by the appropriate arrangement of these functions within a layer subsystem, and in combination, new properties and capabilities can be achieved that previously were impossible or required additional complexity.

1.1 Layer Management 1303

1.1.1 Management Agent 1310

This embedded application provides access to management information on all aspects of layer operation and is the management interface to all embedded applications in this layer. All embedded applications and protocols have an interface with this task. Each application or protocol defines a set of objects and their attributes, which are used to monitor and configure the layer. The agent also has the capability to generate unsolicited event messages that are automatically reported to the manager. Event conditions may be established when the layer is created or for more capable devices created dynamically by the remote manager. The management agent communicates only with other embedded applications in this layer and with one or more system management applications, which communicate with a management system. The system management agent resides in any layer with sufficient scope to reach its manager and represents this device to the management system. A system management agent can only be in one management domain at a time. (Under the control of one manager at a time, i.e. objects and attributes can only be created or deleted, modified, or stopped or started by one manager. More than one manager may be able to monitor its activity however.)

There is no requirement that all layer management agents communicate with the same system management application in the same system, or that they be in the same management domain.

A common management protocol such as SNMP or CMIP might be used for this functionality. MIBs should have branches for vendor-specific software and hardware and technology-dependent parameters in the lower layers.

1.1.2 Enrollment Management 1309

The definition of the Enrollment Phase is to create sufficient shared state within the network to allow an instance of communication to be created. This embedded application implements that definition. For any two entities to communicate they must first have some shared information. Thus we assume that all participants have some minimal implementation of the PNA layer before any communication can begin. Hence we assume that every box has at least one minimal layer. From there more can be created. Enrollment consists of all those functions that are required for systems to communicate: bootstrap operations, key management, etc. Enrollment establishes the character of the layer by defining the range of parameters and policies that the layer will support. The enrollment manager monitors the flow manager to determine when conditions are appropriate for cleaving a layer into two. (This may happen at the outset.) Algorithms exist for subdividing a layer, as well as creating a higher layer of greater scope. (We also assume a management system will exist with information about the subnetwork being created. Any system can act as a management system.) Enrollment policy will set the parameters for the type of layer. Layers will come in various forms: Lower layer media specific, middle layers for network resource allocation; application layers, VPN or closed layers parallel to each other.

Enrollment policy will set the parameters for the type of layer. Layers will come in various forms: Lower layer media specific, middle layers for network resource allocation; application layers, VPN or closed layers parallel to each other.

1.1.3 Address Assignment Management, 1312

This task manages the interactions with subsystems attempting to join this layer, i.e. require an address to be assigned to them. When a new subsystem contacts a subsystem for address assignment, the new subsystem must be confirmed as an acceptable member of the layer and an address assigned that reflects its position in the topology of this layer. (See Theory of Operation section below for more details on how this process works.)

There are basically two policies for this task: 1) a policy that reflects the address topology chosen for this layer, i.e. what addresses can be assigned to a subsystem in direct communication with this subsystem and 2) the degree of authentication and security required on the assignment protocol.

1.2 Resource Management, 1302

10 1.2.1 Flow Management, 1305

This embedded application manages all flows that go through this subsystem. There are four classes of such flows:
1) Flows from the (N+1)-layer created by Flow Management;
2) Flows that terminate in embedded applications within the (N)-layer.
3) Flows created by Flow Management and assigned to Aggregation Engines for distinct classes of QoS or to enhance multiplexing efficiency.
4) Flows that transit this subsystem, i.e. traditional routing.

This task is the heart of resource allocation for this subsystem. When it receives a request for a new allocation from the layer above, the flow manager must determine whether to allocate this to a new or existing (N)-flow. This process takes the output of the routing and QoS monitor along with information from apposite Flow Management and attempts to optimize the flows passing through it. This may include creating flows of similar or aggregated QoS, creating high density flows between intermediate subsystems in the network, etc. Some subsystems may only be transit subsystems and thus have relatively simple Flow Management functionality; others on the borders of subnets may be quite complex. In some cases, this may be influenced by the management system. There is considerable opportunity for policy differentiation in this 30 function.

This embedded application handles part of the traditional functions assigned to "routing." All this application does is route computation. This process uses the information collected by the Address Information Monitor to derive routing and forwarding tables. A variety of routing algorithms may be supported including distance vector, link state, hierarchical addressing, or algorithms that use addresses of other topologies. The primary purpose of this application is to determine the possible routes available to this subsystem. This information is made available for QoS monitoring and flow management. The complexity of this task will depend on where this subsystem exists in the network: Basic intermediate systems will have relatively simple route tables generated; while subsystems on the boundaries between subnetworks, they will tend to be more complex.

In traditional routing protocols there is considerable opportunity for policy because they combine routing, QoS monitoring and flow management (such as it is) together. In this decomposition, routing is limited to only determining the connectivity, not what to do with it. However, here the routing algorithm is the policy. Variation will be in the kinds of routing algorithms used, i.e. the amount of information collected and the amount of processing performed on it. Since the number of paths in a network increases combinatorially with the number of nodes and arcs, in layers with large scope it may be beneficial to have "smarter" routing algorithms to cull redundant and less "useful" routes. Existing routing algorithms may be used for this function.

1.2.3 OoS Monitoring, 1306

This process takes the information provided by Routing and attempts to determine the QoS parameters of each route and categorize the findings. It constantly monitors the performance of routes by active and passive means and provides this information to the Flow Manager, which then assigns traffic to routers, as appropriate. As with MIBs, the parameters and policies for collecting information may have technology specific parameters for lower layers. Active QoS monitoring would occur primarily in border subsystems. There is considerable opportunity for policy differentiation in this function. While the parameters to be measured should be fairly fixed, what one does with them will not be. Also, the amount of data collected and the frequency of collection can be varied.

1.2.4 Address Information Monitoring (AIM) 1307

AIM is responsible for collecting information from other subsystems in this (N)-layer on their mappings of (N)-addresses to (N−1)-addresses and their connectivity in the (N−1)-layer. This function encompasses the function of connectivity (routing) updates and directory update protocols in conventional systems. AIM utilizes its own protocol to collect information from other AIMs in the (N)-layer. Several events can cause AIM to query peers for information: events, e.g. failures, in the network, new subsystems, periodically, or as a matter of policy imposed by the routing algorithm. Some of these events may be involve all members or be tightly focused. Local address mappings are registered in its Address Information Base (AIB).

At the higher layers, this information may be characterized by a large number of destinations and a small number of relays. However, this does not change the basics. In these cases, an AIB is a cache of the mappings required by this sub-system. If a mapping is requested that is not in the cache, this AIM communicates with its apposites in other subsystems to obtain the necessary information.

The structure of these AIBs may be decentralized as connoted by the term cache or can be organized into a tree of directories with the higher nodes being more complete. Note that it is relatively straightforward to start with a decentralized model for small networks and let it evolve into the more structured tree form.

This will require its own application protocol for updates. The nature of maintaining the updates will be a matter of policy and may run the gamut from a combination of caching often used mappings, decentralized queries or table exchanges with nearest neighbors, or a hierarchy of directories managed by a Management System.

Considerable policy options may be developed to optimize the collection of addressing information. Information must be collected for all possible destinations in this layer plus whatever information is needed for routing. The only requirement is that when notified on a new destination subsystem, the AAM is required to determine whether a new address is necessary.

1.2.5 Directory, 1307

A Directory provides information on the mapping of (N)-addresses to (N−1)-addresses for any (N)-application in the (N)-layer. Normally, a directory request will return a result to the level of the type, rather than an instance. Assignment of instance identifiers is done by the destination at allocation time. In some environments, the directory may also maintain instance level information as a component of a common application recovery service.

The information required to satisfy a directory request is a subset of the information required for routing. The directory only returns information about mappings for destinations within the scope of this layer, whereas routing requires information about relays in this layer to the destination. This information is maintained by the Address Information Monitor (AIM). The Directory function is primarily an API to the information base collected by AIM, which explains why it is not represented as a distinct module.

1.2.6 Aggregation Engine, 1304

Aggregation Engines are the terminus of "intermediate" flows of (N)-PDUs that are encapsulated in (N)-flows to improve efficiency of bandwidth and switching delay. These flows will terminate at some intermediate subsystem and individual (N+1)-PDU s will then be put on different outgoing flows originating at this flow manager. The Flow Manager determines the source and destination of these intermediate aggregate flows. This application merely carries out what flow management has determined as quickly and efficiently as possible. As the (N+1)-PDUs are unencapsulated from the incoming flows, they are assigned to queues on the appropriate out-going queues. The aggregation protocol inserts a header in the PDU that points to all of the (N+1)-PDUs that are packed into a (N)-PDU.

This is actually a fairly straightforward operation, a form of one-time memory allocation with convolution. The problem can be stated as follows: Pack as many (N+1)-PDUs into a maximum sized (N)-PDUs for this flow, given that one has only those (N+1)-PDUs that have arrived within a window of $\Delta t$, where $\Delta t$ is the minimum delay that this node can incur.

1.3 Security Management. 1311

The layer subsystem provides the basic security mechanisms for a layer including the Application Layer. The basic mechanisms for authentication, data integrity, data confidentiality, access control, and non-repudiation are provided by the layer along with the associated security management functions. This along with a careful implementation means that a much more consistent and comprehensive approach to security can be taken. Each layer may chose the security policies and encryption algorithms it wishes to support.

Security will not be a single task. A set of mechanisms and policies provide the basic security services: authentication, confidentiality, non-repudiation, data integrity and access control. Except for access control, security services will be built into the data transfer protocols, e.g. authentication and data confidentiality. Standard mechanisms will be provided and used by all applications and protocols. Access Control will be imposed by flow management, since it moderates all communication. (Note: All access requires IPC except for memory management which is within the task. Key management is distinct and communicates via the Management Agent.

The ability of network management to over-ride automatic feedback flow control on aggregated flows combined with traditional techniques for detecting suspicious traffic provides considerable advantage in thwarting denial of service attacks.

1.4 Interprocess Communication Service (IFC) 1316

These functions provide the actual transfer of data between applications.

1.4.1. Relaying and Multiplexing Protocol (RaMP), 1314

This protocol adds the information to the header (primarily addressing to the instance level) to allow it to be routed through the network. All of the mechanisms and policies associated with this protocol are accommodated by the routing, QoS, and flow manager processes.

For additional implementation details, see discussion above regarding mechanism and policy.

1.4.2. Error and Flow Control Protocol (EFCP), 1313:

This protocol implements error and flow control, if required, end-to-end over the scope of this layer. The mechanisms included in this protocol are ordering, data transmission, lost and duplicate detection, data corruption, retransmission control, and flow control. Policies may be specified for all of these. Efficient PDU formats exist to support unitdata, two-way and three-way establishment, etc.

For additional implementation details, see discussion above regarding mechanism and policy.

1.4.3 Forwarding Engine, 1315

This process handles all transit flows. It is intended to be high performance and minimal processing overhead. This process most closely resembles traditional routing. It simply refers to a forwarding table and moves PDUs as quickly as possible from an input queue to an output queue.

2. Operational Overview—Supporting Novel Capabilities 2.1. Exposition of Typical Operations The following provides an overview of the functioning of major operations of a layer. For the first two cases, we assume that a layer is fully established and operating. Then we move to the case of introducing a new subsystem to a layer, essentially equivalent to introducing a new network element. And last, we consider the most difficult cases of splitting a layer in two and creating a new layer of greater scope.

Terminology: The following discussion speaks of primitives between (N+1)-layer and (N)-layer. Because the layer is recursive, we only have to describe this interface once. This single description describes both the upper and lower layer boundaries. The reader should keep this in mind, since it puts a slight twist to our normal linear analysis of protocol behavior. In most specifications, an event at the boundary is followed by an event described later in the specification at the lower boundary. Here, while the flow is the same, the description is not as explicit.

The instantiation of a layer in a system will be referred to as the (N)-subsystem.

The following discussion details the actions for creating a specific instance of communication within the (N)-layer/subsystem. We will refer to this as an (N)-flow regardless of whether it uses connection or connectionless mechanisms.

An (N)-flow will be defined as all PDUs exchanged between the same source and destination address pairs, where the pair addresses are unambiguous to the granularity of an instance, i.e. RaMP addresses and EFCP-ids.

2.1.1 Flow Creation

When an (N+1)-PM requests a new allocation, the (N+1)-subsystem attempts to create a new (N+1)-flow. The (N+1)-subsystem looks up the destination (N+1)destination address to get the (N)-address of the destination. It now may request the allocation of communication resources to transfer data to the (N+1)-subsystem. The request is handled by flow management, which translates the requested QoS parameters into the appropriate EFCP and RAMP policies. The flow is assigned to either a new or existing aggregation engine. The flow management determines an assignment to a lower layer flow. The flow allocation follows the usual 2 or rarely 3-way handshake and if successful a flow or connection is created.

In this approach, the flow creation is always "end-to-end," where the "ends" are more relative than in traditional systems. The determination and allocation of resources along the path taken by the flow is not part of flow creation. Flow creation is purely concerned with state synchronization of the "ends." The path taken by the flow and the allocation of resources along that path, if any, is the responsibility of flow management. Hence, flows are connection-like end-to-end, but as connectionless between the ends as flow management determines (which may vary over the life of the flow).

2.1.2 Subsystem Announcement

All address assignments are temporary and must be periodically renewed. This not only serves as a guard against spoofing, but also ensuring that the node is operational and management information current. Consequently, this procedure is very much a part of normal operations. Hence, recognizing a new device and mobility are basically just other variations of this same procedure, where a new device is the case where the process starts with N=1 and mobility is either a new device or a new SNPA for an existing device depending on point of view.

The new subsystem must have either a unique identifier (potentially a serial number or digital certificate) or the address of the lower layer. The new subsystem, A, is directly attached via some lower layer (including physical media) to a subsystem, B, that is already in the network. A makes itself known to the network by sending an unsolicited PDU (a management protocol event) to B requesting assignment sending its unique id or lower layer address.

B contacts its management system to determine whether this potentially new subsystem with the supplied unique ID or lower layer address is acceptable. If so, B may establish an authenticated, secure connection to A. B then becomes the agent for the management system. Based on the position of A in the network an address is assigned to it by the management system and sent to B's management agent which then sends it to A. A now has an addressable subsystem at this layer. B disconnects from A. The management system can now include A in its management domain (or assign it to another). B notifies the Address Information Manager for both this layer and the layer above. This may cause further activity at the (N+1)-layer to update routing information and the assignment of (N+1)-addresses.

Normal operation may proceed. If this is a new subsystem, the responsible management system then may establish direct communication to complete its configuration. It can now specify the parameters characterizing this layer and downloading any policies that may be necessary for the correct operation of its protocols and embedded applications.

2.1.3 Addressing Changes

In accordance with the invention, there is no need for special mechanisms relating to address changes for mobility. Instead, such address changes manifest themselves to a system as a Subsystem Announcement (see above) and the address assigned reflects the subsystem's (potentially new) location in the network. Strictly speaking, the addresses of network elements in a layer do not change. It is more precise to say that new elements are created and assigned new addresses (by the Subsystem Announcement procedure described above) and over time the "old" elements ceased to be used and they and their addresses are deallocated. The mobility of systems is substantially equivalent to dynamic multi-homing. This process utilizes the topological addressing techniques described elsewhere in this patent.

There are essentially 3 forms of mobility to be considered:
1) disruptive, when a system simply appears in a new locale, e.g. a laptop connect to the net in Boston is shut off during travel and re-connected in Denver;
2) non-disruptive when a system moves continuously from locale to locale with respect to a fixed network, e.g. cellular; and
2a) non-disruptive with continuous movement with respect to other mobile systems, e.g. ad hoc networks.

When a system moves, several things must occur. The directory must be notified that the address for new bindings have appeared and propagate this information for routing and to other directories in this layer. The address assignment task must determine whether the addresses for this layer are still topologically appropriate and if not, begin the process of creating and assigning new ones to reflect the new position of the subsystem in the topology. The layer initiating the lower layer address change will create a flow for traffic bound for this system (subnet) that has not yet been able to shift traffic to a new route.

We presume that either the mobile system is periodically looking for new SNPAs or the subnets to which it attaches are periodically looking for new members or both. In other words, either the mobile system or the subnets periodically broadcast PDUs advertising their presence. When the mobile system detects such a new SNPA it may attempt to use it.

There are essentially two problems: 1) when to start using a different SNPA and 2) how to tell when a new (N)-entity needs to be created. 1) is relatively easy. A QoS policy will indicate when a new SNPA has better attributes than the previous one. A different first (or last hop) is chosen based on error-rate, bitrate, signal strength, etc. 2) is the more difficult problem and is really only a problem for cases 2 and 2a.

Case 1 is equivalent to a new system and assignment proceeds. (Once a device is accepted as a valid member of the network, the management system may assign all layer addresses at one time, rather than letting them percolate up the stack.) In any case, it turns out to be a degenerate case of the solution for 2 and 2a.

Consider the problem: A system (end or intermediate system) would already have addresses assigned to (N)-entities in all layers. As it moved it would become aware of new SNPAs, it would respond to some of these based on various QoS parameters and ask for a new address assignment. This would occur first at the bottom layer. Adopting a new SNPA would imply a new address assigned to a new bottom 10 layer protocol machine.

In most cases, this new (N)-PM would be mapped to the same (N+1)-PM as any other SNPA this system has. However, every so often a mobile system may reach the limits of a topological region in the (N+1)-layer and need to have a new (N+1)-address assigned to reflect its topological position.

This would happen even less frequently at the next layer up and so on with decreasing frequency with only the application name (being location-independent) remaining constant regardless of how far the mobile system moved. The question is how is the system to determine when this should happen? When should it create a new PM in the (N+1)-layer or when does the new (N)-address map to an existing (N+1)-address?

There is nothing about the (N)-address that indicates what upper layer domain it belongs to. In fact, while unlikely it is possible for a system to have the same (N)-address (representing different PMs) bound to different (N+1)-addresses. (This is because the (N)-address need only be unambiguous within the scope of its (N)-layer.) We can not expect (or require) the mobile system to have sufficient information about the global topology to know when it moves from one domain to another. So it would seem that some external knowledge is going to have to be used. Taking into account that this event is fairly infrequent, we do not want a solution that requires each (N)-PM all the way up the stack to communicate with its peer for an address assignment every time the physical point of attachment changes, especially if most of the time most layers would not need one.

A solution is as follows: Starting at the bottom, a mobile system becomes aware of a new SNPA (either by polling or being polled). It requests an address assignment by the equivalent of a DHCP-like protocol. A new PM is created and named with this address. The (N)-layer (N=1 in this case) notifies the (N+1)-layer that the new address is available. Initially, the (N)-address is bound to the existing (N+1)-address. If it has entered a new topological region of the (N+1)-addressing domain, the system manager that assigned the new (N)-address to the mobile system, may notify it that it bind the newly assigned (N)-address to a new (N+1)-address.

The address assignment for the (N+1)-layer proceeds just as it did for the (N)-layer. If the assigned address is in a different domain (or just a different address) the system knows to create a new (N+1)-PM and bind the new (N)-address to it. This continues up the layer until a layer is encountered where a new address is not assigned to a new PM. In other words, the (N)-address is dual homed to the (N+1)-PM. In either case, a routing update will be triggered and the nature of the advertisement by the mobile system will distinguish whether it is an end or intermediate system.

When an (N)-address ceases to be used, i.e. falls well below some QoS policy, the (N)-address is de-assigned and the (N)-PM de-enrolled. (This will cause an update of the routing information.) When all (N)-addresses, bound to a given (N+1)-address are de-assigned, the (N+1)-address and (N+1)-PM are de-assigned, and so on.

2.1.4 Layer Creation/Mitosis

In accordance with this invention, layers operate over a range of bandwidth. The lower the layer the higher the bandwidth. However, these ranges are in practice not fixed and are created taking into account both range of bandwidth and load. The range of bandwidth may be sufficiently great to warrant separation into more than one layer, however, the management of a subnet may choose not to create another layer if say, a layer only has a very small number of high bandwidth flows and more lower bandwidth flows or vice versa. The management may either establish conditions for when to split the layer into a lower bandwidth upper layer and a higher bandwidth lower layer of the same or smaller scope or retain control and initiate new layer creation itself.

While these are necessary and interesting capabilities of the PNA architecture, it is unlikely that they will see heavy use. The nature of traffic is such that the deeper layers should show considerable stability and even flows will be very long lived. These capabilities may be of greater use at the top of the architecture in creating VPNs or other specialized distributed system environments.

2.1.5 Layer Mitosis (Smaller Scope)

In accordance with the invention, this can be done quite easily and with no disturbance to the established flows. Appropriate commands are sent to the Enrollment Management tasks in all subsystems of this layer specifying the splitting of the layer into a lower bandwidth upper layer and a higher bandwidth lower layer. The flows are identified as to which will be in the lower layer and which in the upper layer. The addresses of those being moved to the lower layer are decommissioned in the upper layer and vice versa in the lower layer.

To create a lower layer of less scope implies that there will be multiple layers of the same rank of the lesser scope (sufficient to include all subsystems in the upper layer). The management system determines which subsystems will be in which lesser scope layers. These are sent the appropriate commands to their Enrollment Management tasks. Since the new lower layers have less scope they also have shorter addresses. Any higher bandwidth flows would be assigned new addresses at the lower layer. (This is just another form of mobility.) Routing tables and directories are updated appropriately.

New instantiations of all embedded applications are created for the lower layer and given parameters and policies appropriate for the narrower and higher bandwidth range. Similarly, the parameters and policies of the upper layer are modified to the narrower and lower bandwidth range that it now has.

2.1.6 Layer Mitosis (Same Scope)

In accordance with the invention, this case is a degenerate case of the case above. Since the layers of the same scope, the same addresses can be used. The aging time prevents these addresses from being reused too soon. High bandwidth flows in place at the time stay with the lower layer. The lower bandwidth flows are multiplexed on to an appropriate lower high bandwidth flow by flow management.

2.1.7 Layer Creation (Increased Scope)

In accordance with this invention, this case has similarities to a combination of communicating through a NAT box and adding a new device. Assume that a management system determines that it should form a new upper layer with greater scope. It determines a subnet to start with. It communicates with the Enrollment Manager or the "top" layer of all subsystems in that subnet and sends the necessary commands to create a new layer above with longer addresses. This proceeds as in the above cases. Once this is in place the manager then proceeds adding collections of subsystems one subnet at a time to the new layer, as if the elements in that subsystem were "new" systems. Since there could be no applications that required the broader scope, there will be no existing flows to be moved to this layer. Note: This procedure can be used in ad hoc networks to merge two ad hoc subnets that come within proximity of each other and need to communicate.

3. Characterization of Types of Layers

The following discussion characterizes some of the major types of layers and describes examples of the some of the more common instantiation of a layer subsystem in a computer network.

Figure 14:
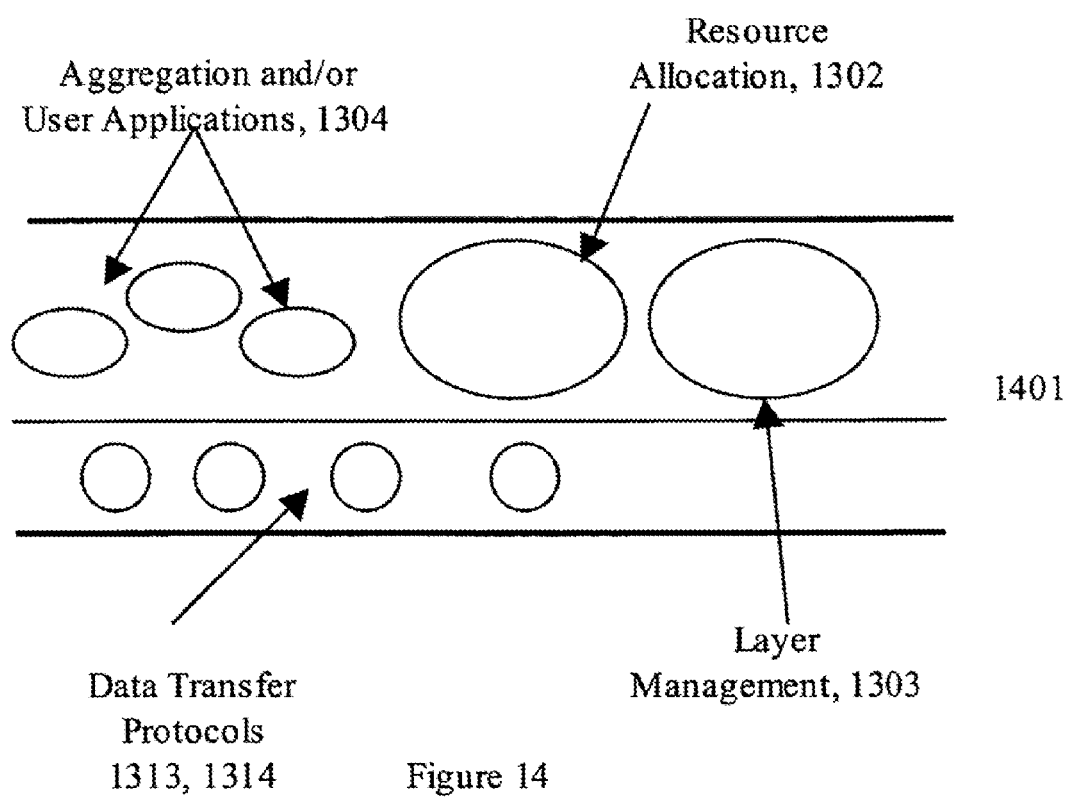
FIG. 14 an abstraction of the schematic diagram of FIG. 13.

In particular, FIG. 14 shows a high level view of one such sub-system (which is also used in connection with subsequent drawing figures).

3.1 Relation to Traditional Layers

To aid in understanding, let us first consider how PNA layers match to more traditional layered architectures. The layer has 2 sublayers: IPC and the embedded applications. These generally correspond to two layers in the Internet architecture or OSI architectures. Thus, the correspondence to a traditional 7 layer structure would map to 3 in PNA: one, physical and data link; two, network, transport and session; and three, presentation and application.

Figure 15:
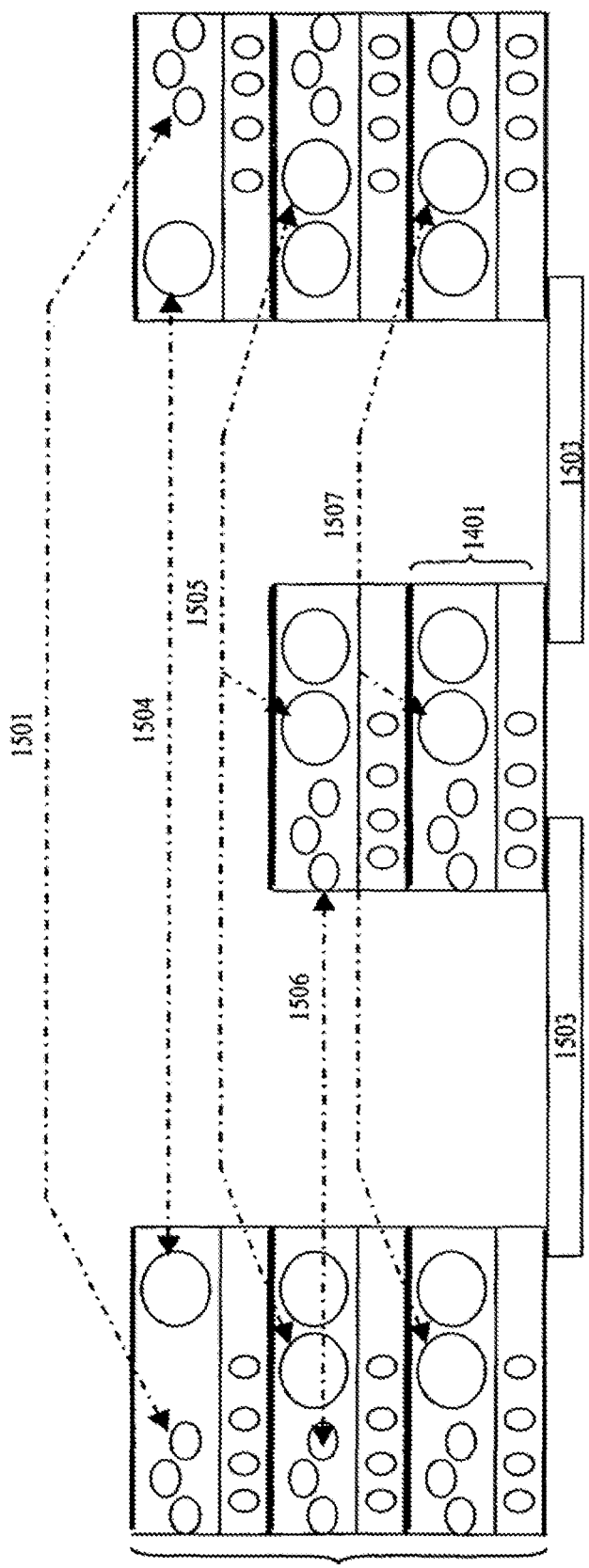
FIG. 15 is a schematic diagram depicting virtual connections or shared state between application protocols in a layer subsystem.
Figure 16:
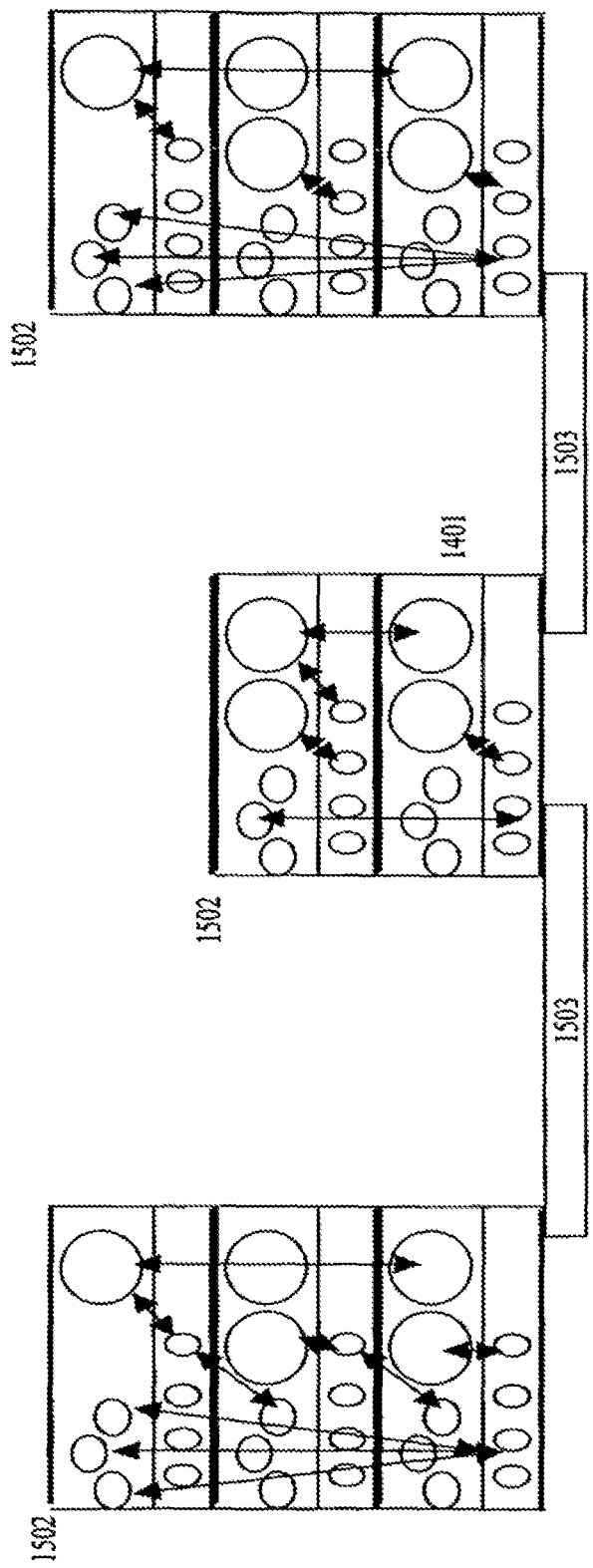
FIG. 16 is a schematic diagram depicting data flows among elements of a subsystem that create the virtual connection or shared state in FIG. 15.
Figure 17:
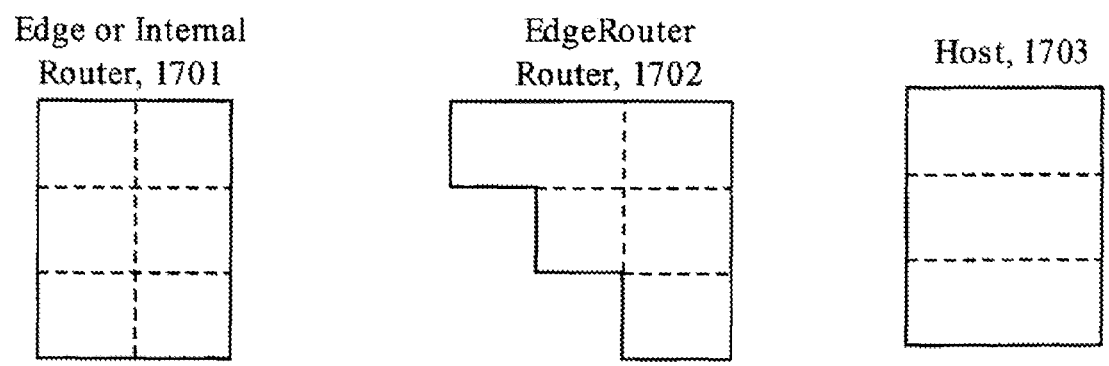
FIG. 17 is an abstraction of FIG. 14, depicting two forms of routers.

FIG. 15 shows traditional layered systems 1502 consisting of two hosts on the ends communicating through a router in the middle connected by physical media, 1503. The figure further indicates peer protocol relations (associations or connections) that exist between applications. There will be an association between aggregation applications 1501 or 1506, and between resource allocation applications 1505 or 1507. In general, all subsystem management applications will communicate with a single system management application in each system, which will in turn communicate with a management system. The system management application need not be in the top layer. The only requirement is that layer management applications be present in a layer with sufficient scope to communicate with its manager. FIG. 15 also indicates the systems, which maintain virtual flows, i.e. synchronized state. FIG. 16 indicates the actual flow of data. FIG. 17 provides a representation of three forms of commonly occurring systems. 1701 represents the configuration of a router when the physical media being switched are of comparable bandwidth. 1702 represents the configuration that often occurs at the boundaries of subnets where lower bandwidth media is routed onto higher bandwidth media. 1703 represents a host which does not (as a rule) relay data. Modeling systems entirely in the new model could be much richer. Systems that had a set of applications operating over a wide range of bandwidth might involve more layers for them to be multiplexed appropriately. Some applications would involve more layers for one and two phase commits, etc. VPNs are essentially distinct layers. This implies multiple layers of the same rank, i.e. side by side.

3.2 Classes of Layers

This basic layer architecture is used in 3 fundamental roles. The Subnet form requires the full complement of functionality while the other two are degenerate cases.

3.2.1 Subnet Layers

This is the full layer with all functionality. In general, these would operate over logical or physical subnetworks.

3.2.2 Multiplexing Layers

In this aspect of the invention, multiplexing layers are created over a subnet layer to provide additional multiplexing granularity over the same scope as a normal subnet layer. These might be created for layers that would otherwise have flows with too wide a range of bandwidth. These layers would have everything except routing and QoS monitoring. The degree of error and flow control required will depend on the nature of the traffic. If the top multiplexing layer supports applications then more error and flow control might exist to ensure end-to-end reliability. It may also occur to provide greater flow control, or it may be sufficient to have flow control in the 5 supporting subnet layer only.

3.2.3 Application Layers

Generally, an application layer will consist of service to provide identification and security, a directory, enrollment, and possibly a system management agent. Data transfer services will generally provide only common initial connection synchronization. However, more elaborate functions requiring error and flow control may be required for applications using one-phase or two-phase commit procedures. Similarly, more elaborate flow management services will be required if applications are present that do relaying. Applications occupy the data transfer phase of these layers and 15 may sub-divide this phase to fit the requirements of the application.

3.3 Classes of Subsystems

Figure 18:
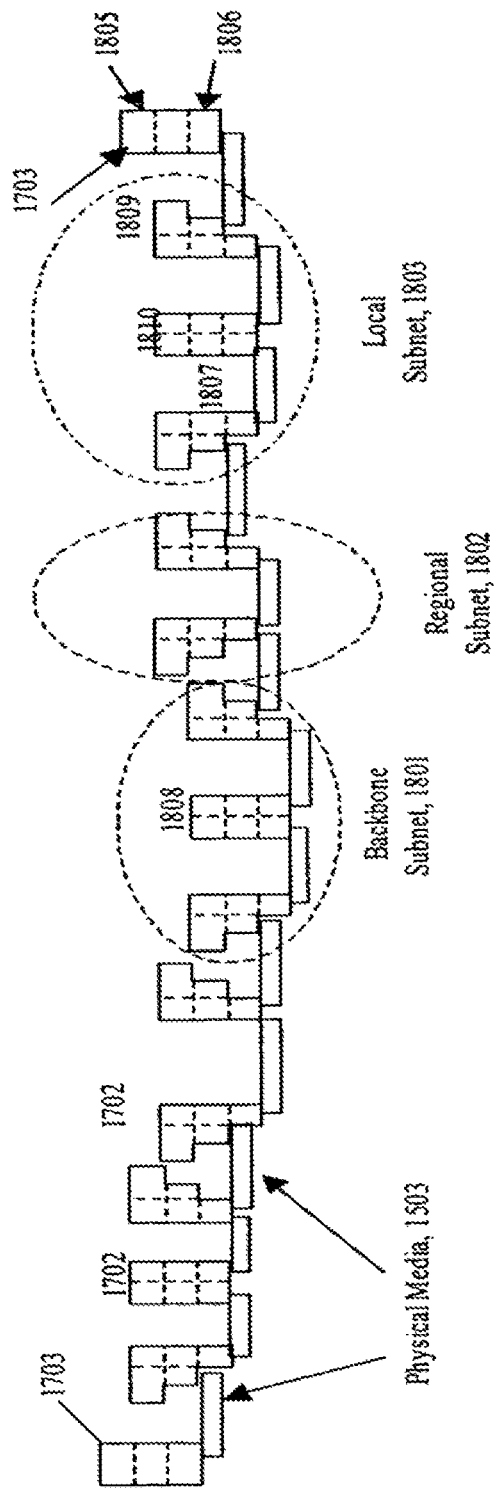
FIG. 18 is a schematic diagram illustrating the use of the recursive architecture 15 of the present invention in an exemplary hierarchical network, highlighting certain classes of systems and layer subsystems.

The following discussion characterizes different configurations of layers that would be prevalent in a network. In some kinds of subsystems, some functions are not needed or are greatly reduced and in others play a major role. The subsystems described below are illustrated in FIG. 18.

In accordance with the invention, this subsystem would be found as the lower layers of a host, i.e. not the applications. The minimal number of lower layers is 2, although it is likely that the lowest layer would be an existing physical/data link configuration. More layers might be required in host with applications generating a wide range of bit rates.

Layer Management: Enrollment would be reasonably minimal, since the characteristics of this kind of layer are fairly common. Security services would not get heavy use unless there was a requirement to avoid traffic analysis. Most host security services would occur at the layer above.

Address Management: The directory function would be very limited since the only applications are the other internal embedded applications. Routing would essentially be limited to dual-homing and since most host are not dual homed would be absent in those.

Resource Management: This class of subsystem would not have aggregation engines or a forwarding engine. (Aggregation engines might exist to support particular applications, e.g. HTTP 1.1.) The Flow manager and QoS monitor would be present but mainly to collect end system data on performance and to categorize applications for QoS. Since the range of applications to be run would not be that dynamic, the Flow Manager operations would be fairly limited.

IPC: Policies for the data transmission protocols for the bottom layer would be tailored to the characteristics of the media. Polices for the layer supporting the applications would be match the applications to the requirements of the classes of the network QoS.

3.3.2 Application Subsystems. 1805

In accordance with this invention, this subsystem would support user applications, as follows:

Layer Management: Enrollment would be required for introducing new distributed applications and ensuring that their names were entered in the Directory. Security services would be very important especially authentication and confidentiality. Multiple security policy packages would be supplied to provide different levels of services at different costs in resources.

Address Management: The Directory would be extensive since it would need information on all possible applications that could be addressed.

Resource Management: Routing would only be present if there were relaying applications such as a re-cast mail protocol or OL TP to be supported.

IPC: EFCP and RAMP would only be involved for checkpoint recovery and transaction processing functions.

3.3.3 Border Subsystems, 1807

In accordance with this invention, border subsystems would have the most extensive functionality. Everything would be present and reasonably utilized. These would be the most sophisticated and complex subsystems. Border subsystems at the periphery will be more complex than those deeper in the network. Those at the periphery will have more flows of different types to manage, while deeper ones will be limited by the number of border points at this level and the number of classes of QoS. (As one goes deeper into the network, finer granularity classes of QoS may be aggregated, so the number of classes will get smaller or remain the same.)

Layer Management: Enrollment would be representative of any of these subnet systems. There would be little requirement for security, since there is no information in the clear at this level that would tell an attacker anything. Most VPNs would be implemented above this level although it is possible for Border subsystems near the periphery to support VPNs. The only flows to be protected would be AIM updates and Management Agent flows.

Address Management: Routing and address assignment will be fairly standard. These subsystems will benefit from techniques that route based on addresses. The Directory would be fairly limited since there are only the embedded applications.

Resource Management: QoS Monitoring and Flow Management will be the most sophisticated in these subsystems. This is where flows are aggregated. Potentially there will be an aggregation engine for every QoS class to every remote Border Subsystem IPC: EFCP would be used for flow control but unlikely that error control would be required.

3.3.4 Peripheral Subnet Subsystems, 1809

In accordance with the invention, Peripheral Subnet Subsystems are the lower layers of Border Routers. It is possible to have several varieties of these i.e. campus, metro, regional, etc., although they differ primarily in degree. Everything would be present and reasonably utilized. These subsystems would be optimized for larger numbers of flows going to a fewer number of places, i.e. locally or to a border. As one moves toward the core, these subsystems would take on characteristics more like Core Subnet Subsystems.

Layer Management: Enrollment would be representative of any of these subnet systems. Security could be used to provide VPNs. The only flows to be protected would be AIM updates and Management Agent flows.

Address Management: Directory would be limited but because these layers have larger scope and therefore more subsystems are addressable. While the number of systems to route to is large, the number of places to route them to is small: either locally (in the area or a nearby one for which there is a shortcut) or to the core. One would want routing algorithms here that converged quickly to changing conditions, since there is a potentially larger number of alternatives this far from the core.

Resource Management: Aggregation would do initial multiplexing and matching the classes of QoS coming from end systems to the classes of QoS in the deeper subnets. The Flow Managers would take their cue from Flow Managers deeper in the core, creating categories of QoS that best match what these deeper subnets want to see.

IPC: EFCP would be present for flow control, but not error control. The use of error control might occur in the lowest layers of peripheral subnets with very lossy characteristics, i.e. wireless.

3.3.5 Core Subnet Subsystems, 1808

In one practice of the invention, these subsystems would be the highest performance but would have the least variability. Once one is this deep in the network, flows are for the most part permanent and routes are constant. Changes occur mostly in response to failures. Everything would be present and reasonably utilized.

Layer Management: Standard enrollment processes very little variability. The only flows to be protected would be AIM updates and Management Agent flows. All VPN support would be above these subsystems.

Address Management: Directory would be fairly limited since it need only store information for other embedded applications in the core subnet. Routing could almost be fixed, with fixed failure modes.

Resource Management: Flow management will be handling the smallest number of classes of QoS and the smallest number of destinations. QoS monitoring will be necessary but will also be showing the least variability. The important characteristic here will be adequate and immediate response to failures and disasters.

IPC: Flow control will be used but most likely not error control.

3.3.6 Internal Subnet Subsystems, 1810

In one practice of the invention, these subsystems are similar to Core Subnet Subsystems but are internal to subnets outside the core. The difference here is that there are more flows (but most are transit flows) and routing is within the subnet only.

Layer Management: Standard enrollment processes little variability. The only flows to be protected would be AIM updates and Management Agent flows.

Address Management: This can be substantially conventional. An important requirement is that routing must be able to respond quickly to failure.

Resource Management: Aggregation engines would not be present since it would have been done at the edges of the subnet. Flow managers will not be needed. They are at the borders of the subnets with these subsystems.

IPC: RAMP is present but not EFCP, except for connections to embedded applications.

3.4 Further Examples

Traditionally, all systems have the same number of layers and the same layers. This approach arose when the difference in bandwidth of the available media did not span a large range. However today, bandwidths may range over 12 decimal orders of magnitude. Hence some layers may operate at only some bandwidths and then at some routers be multiplexed by encapsulation onto media of higher bandwidth. This is represented in FIG. 17 by slightly modifying the traditional layer diagram of a router, as shown by the edge or border router, 1702. Each step on the left side of 1702 represents interfaces at a layer of lower bandwidth. Bandwidth decreases as one moves up these stair steps. Traffic is multiplexed onto lower layers at higher bandwidth. Traditional routers, 1701, may also occur either at the edge or at the boundary of two subnets with comparable bandwidth.

FIG. 18 indicates how this might be used in networks with widely disparate amounts of bandwidth. Hosts, 1703, communicate with routers in local subnets, 1803, which are multiplexed onto regional subnets, 1802, which are in turn multiplexed onto backbone subnets, 1801. The layers indicated here are exemplary and could be done to any depth.

Figure 19:
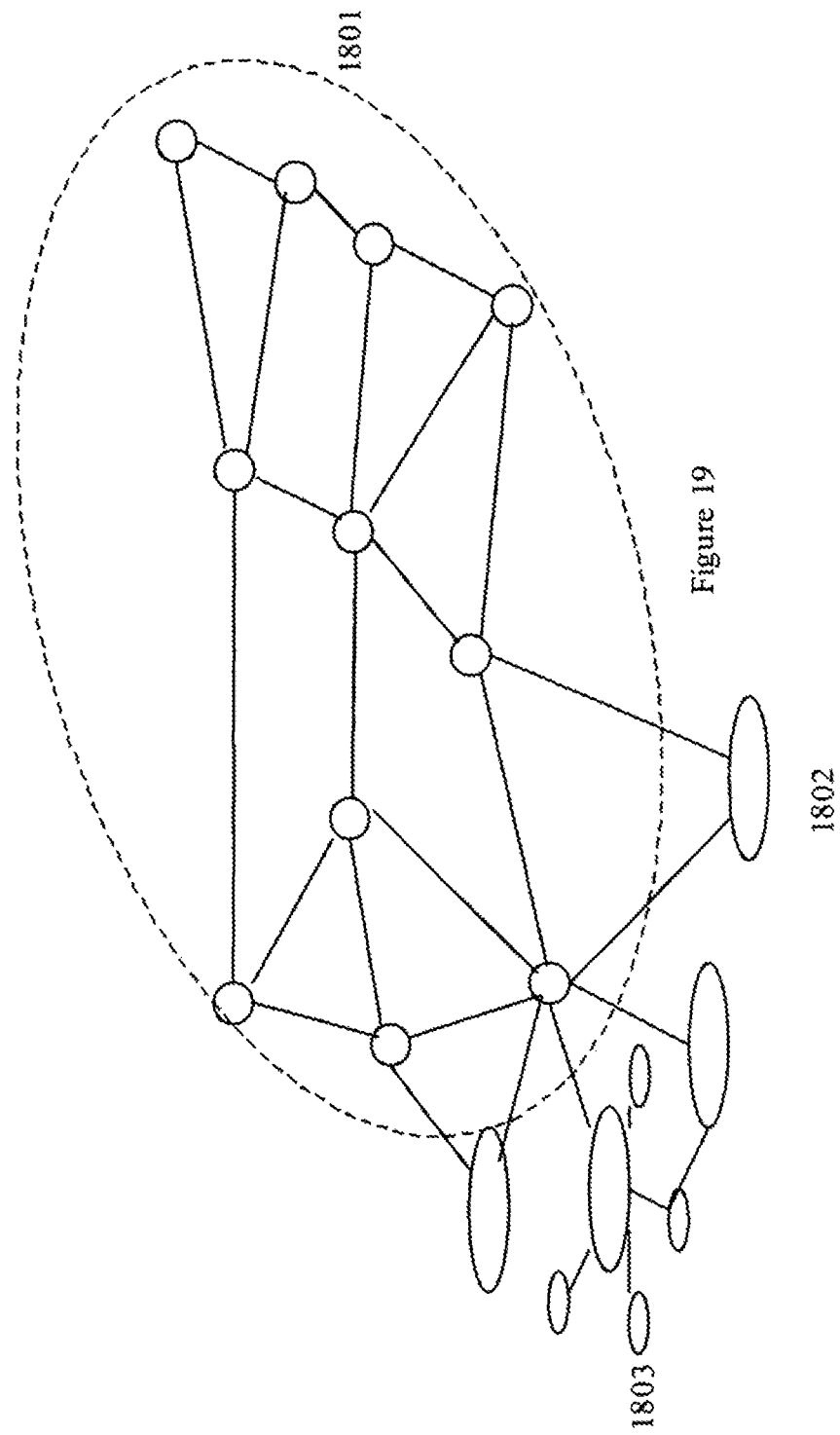
FIG. 19 is a schematic diagram presenting a "top view" of a typical hierarchical network.

FIG. 19 provides a "top-view" of a typical network similar to FIG. 18 with a nationwide backbone 1801, regional subnets 1802 and local subnets 1803.

Figure 20:
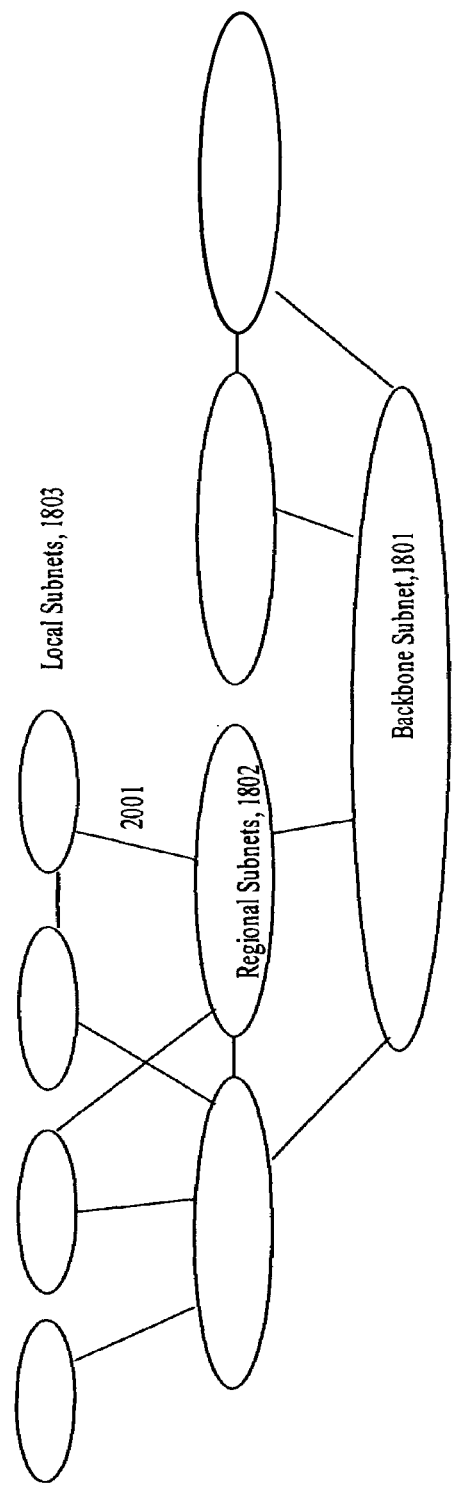
FIG. 20 is a schematic diagram depicting a "side view" of the network of FIG. 19.

In turn, FIG. 20 provides another view of such a typical network indicating physical connections 1801 among subnets 1801, 1802, and 1803. While the organization is generally hierarchical, not all such connections are strictly hierarchical. These non-hierarchical connections may include to optimize the performance of the network. A topology that could be adopted for an address space for such networks might utilize this strong presence of hierarchy to simplify and optimize routing.

IV. Algorithmic Implementations

FIGS. 21-24 are flowcharts illustrating algorithmic practices of the invention, and these method aspects will next be addressed with reference to the noted drawing figures.

Figure 21:
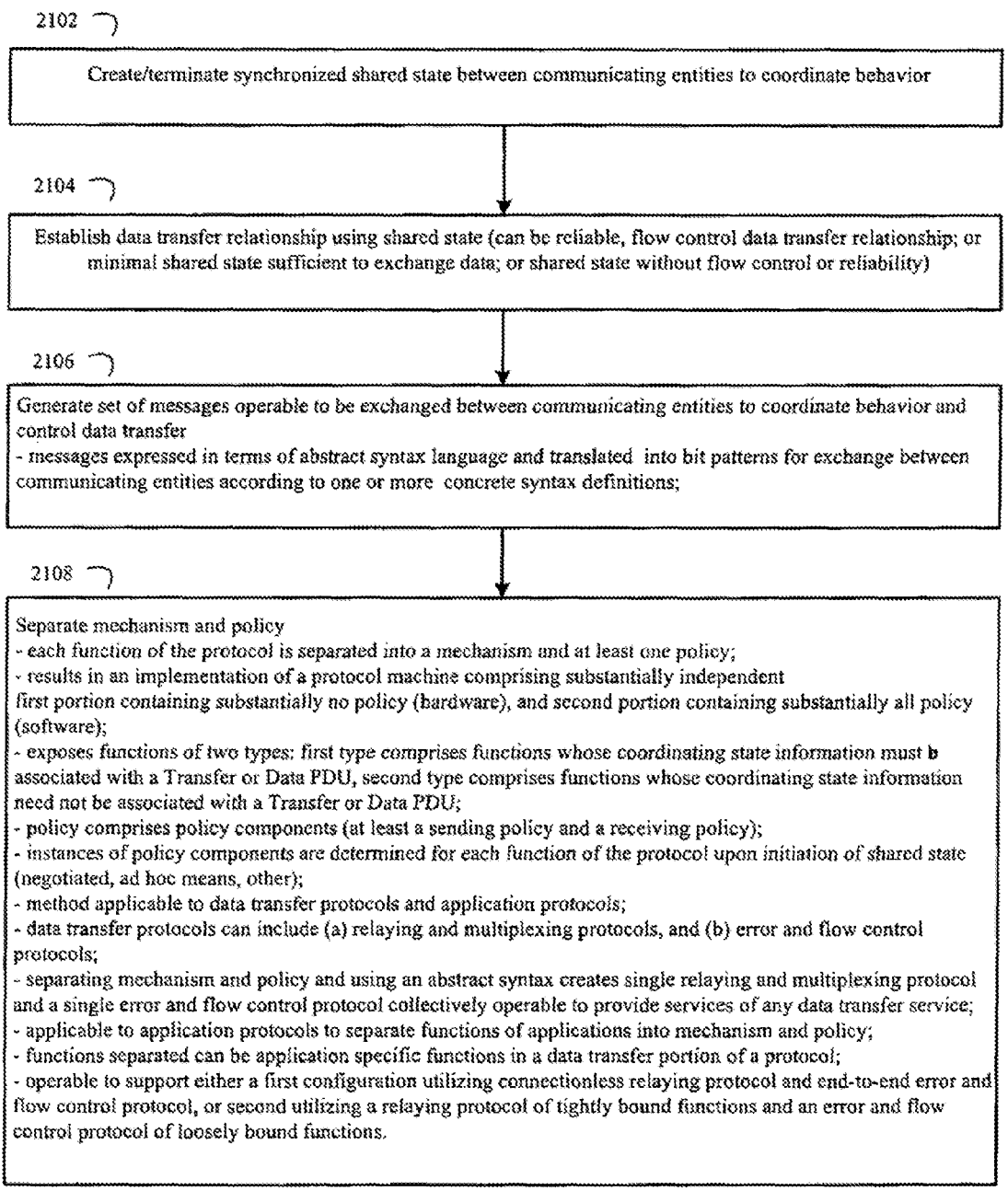
FIG. 21 is a flowchart illustrating a practice of the invention relating to separation of mechanism and policy.

Separating Mechanism & Policy: As shown in FIG. 21, a method of operating a network in accordance with the invention can include creating and terminating synchronized shared state between communicating entities to coordinate their behavior (2102), establishing between the communicating entities, responsive to the shared state, a data transfer relationship using the shared state (2104), and generating a set of messages operable to be exchanged between the communicating entities to coordinate their behavior and control the transfer of data (2106).

The data transfer relationship can be a reliable, flow-controlled data transfer relationship. Alternatively, the data transfer relationship may be characterized by any of (1) minimal shared state sufficient to exchange data or (2) shared state without flow control or reliability.

In one practice of the invention, the messages are expressed in terms of an abstract syntax language and are translated into bit patterns for exchange between communicating entities according to one or more concrete syntax definitions (2106), and each function of the protocol is separated into a mechanism and at least one policy (2108). The policy includes policy components, which in turn include at least a sending policy and a receiving policy. Moreover, instances of policy components are determined for each function of the protocol upon initiation of shared state. In particular, instances of policy components can be negotiated for each function, or they may be determined by ad hoc means or other known methods.

The foregoing method may be applied to data transfer protocols and to application protocols. Such data transfer protocols can include (a) relaying and multiplexing protocols, and (b) error and flow control protocols.

In accordance with the invention, separating mechanism and policy and using an abstract syntax creates a single relaying and multiplexing protocol and a single error and flow control protocol, and the single relaying and multiplexing protocol and single error and flow control protocol, either alone or in a combination of layered organization, are operable to provide the services of any data transfer service.

In addition, methods according to the invention can be applied to application protocols to separate functions of applications into mechanism and policy. The functions separated can be application specific functions in a data transfer portion of a protocol.

Separating mechanism and policy also exposes functions of two types, wherein a first type comprises functions whose coordinating state information must be associated with a Transfer or Data PDU, and a second type comprises functions whose coordinating state information need not be associated with a Transfer or Data PDU. Separating mechanism and policy also enables an implementation of a protocol machine comprising substantially independent first and second portions, wherein the first portion contains substantially no policy, and the second portion contains substantially all policy. The first portion is substantially a hardware portion, and the second portion is substantially a software portion.

As noted above, methods according to the invention are further operable to support either (or both) of two configurations, a first utilizing a connectionless relaying protocol and an end-to-end error and flow control protocol, and a second utilizing a relaying protocol of tightly bound functions and an error and flow control protocol of loosely bound functions.

Figure 22:
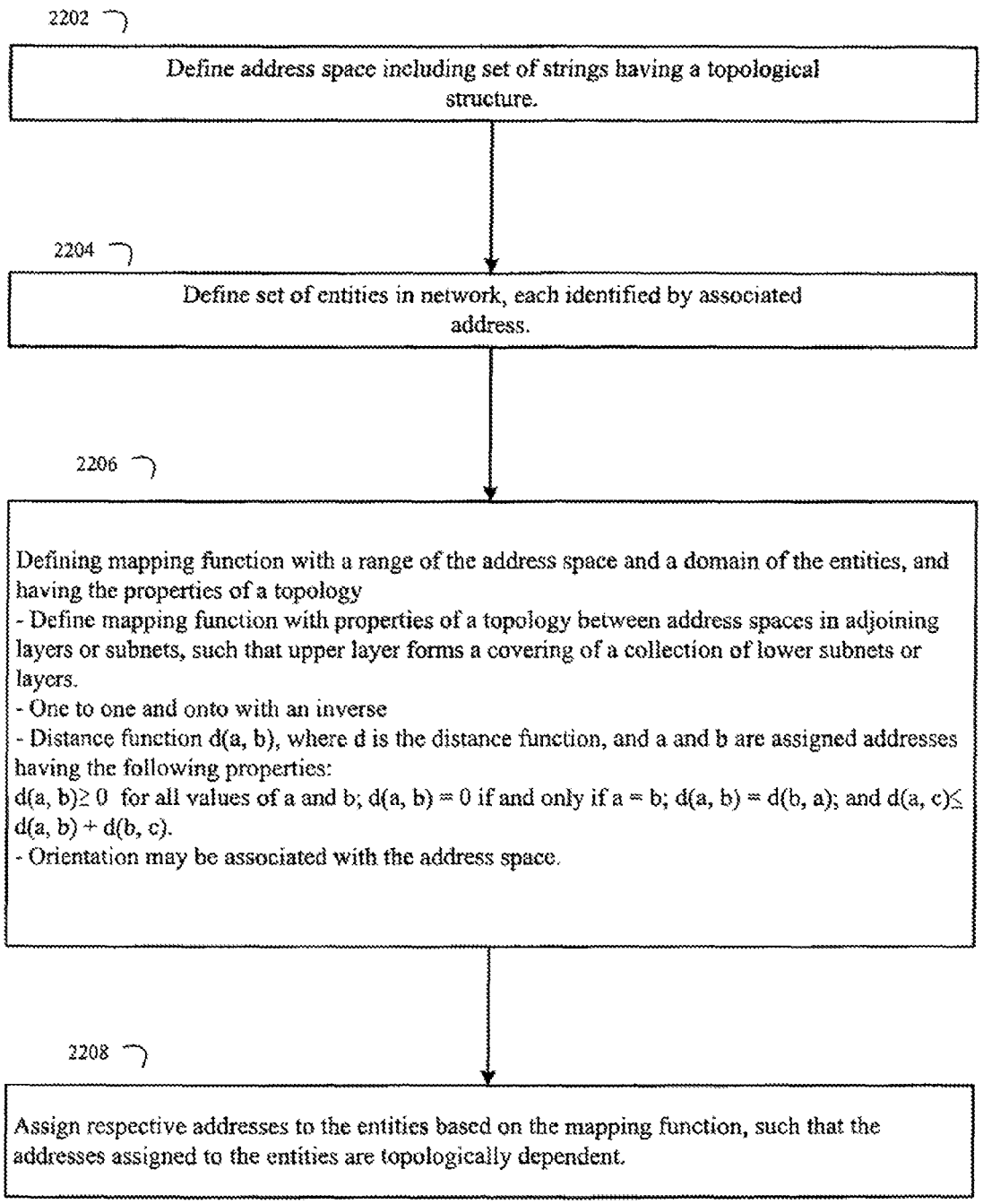
FIGS. 22 and 23 are flowcharts illustrating practices of the invention relating to topological addressing.
Figure 23:
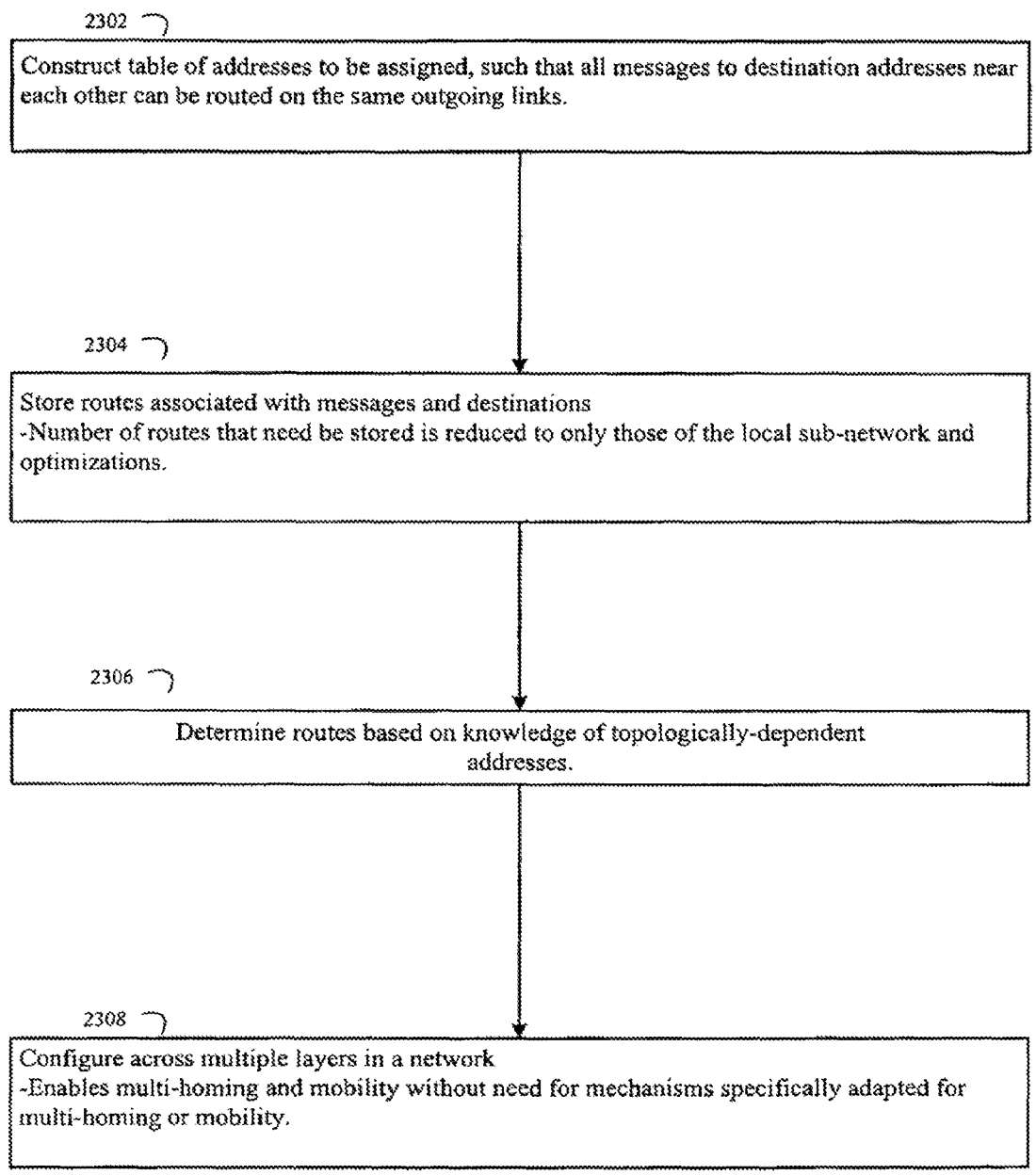

Topological Addressing: As shown in FIG. 22, a method of assigning addresses to entities in a network can comprise defining an address space including a set of strings having a topological structure (2202), defining a set of entities in the network, each entity identified by an associated, respective address assigned thereto (2204), defining a mapping function, the mapping function being defined with a range of the address space and a domain of the entities, and having the properties of a topology (2206), and assigning respective addresses to the entities based on the mapping function, such that the addresses assigned to the entities are topologically dependent (2208).

The defining of a mapping function (2206) can include defining a mapping function with the properties of a topology between address spaces in adjoining layers or subnets, such that the upper layer forms a covering of a collection of lower subnets or layers. As noted above, the mapping function may be based on a topology having a distance function d(a, b), where d is the distance function, and a and b are assigned addresses having the following properties:

d(a, b)≥0 for all values of a and b; d(a, b) 0 if and only if a b; d(a, b)=d(b, a); and d(a, c) d(a, b)+d(b, c).

In addition, an orientation may be associated with the address space.

Also as noted above, and here with reference to FIG. 23, the network may include outgoing communications links operable to carry messages, assigned addresses may comprise destination addresses, and the method may also include constructing a table of addresses to be assigned, such that all messages to destination addresses near each other can be routed on the same outgoing links (2302). The method may also include storing routes associated with messages and destinations, and wherein the number of routes that need be stored is reduced to only those of the local sub-network and optimizations (2304). Routes can then be determined based on knowledge of topologically-dependent addresses (2306). Still further, the foregoing steps may be applied across multiple layers in a network, so as to provide multi-homing and mobility 30 without need for mechanisms specifically adapted for multi-homing or mobility (2308).

Figure 24:
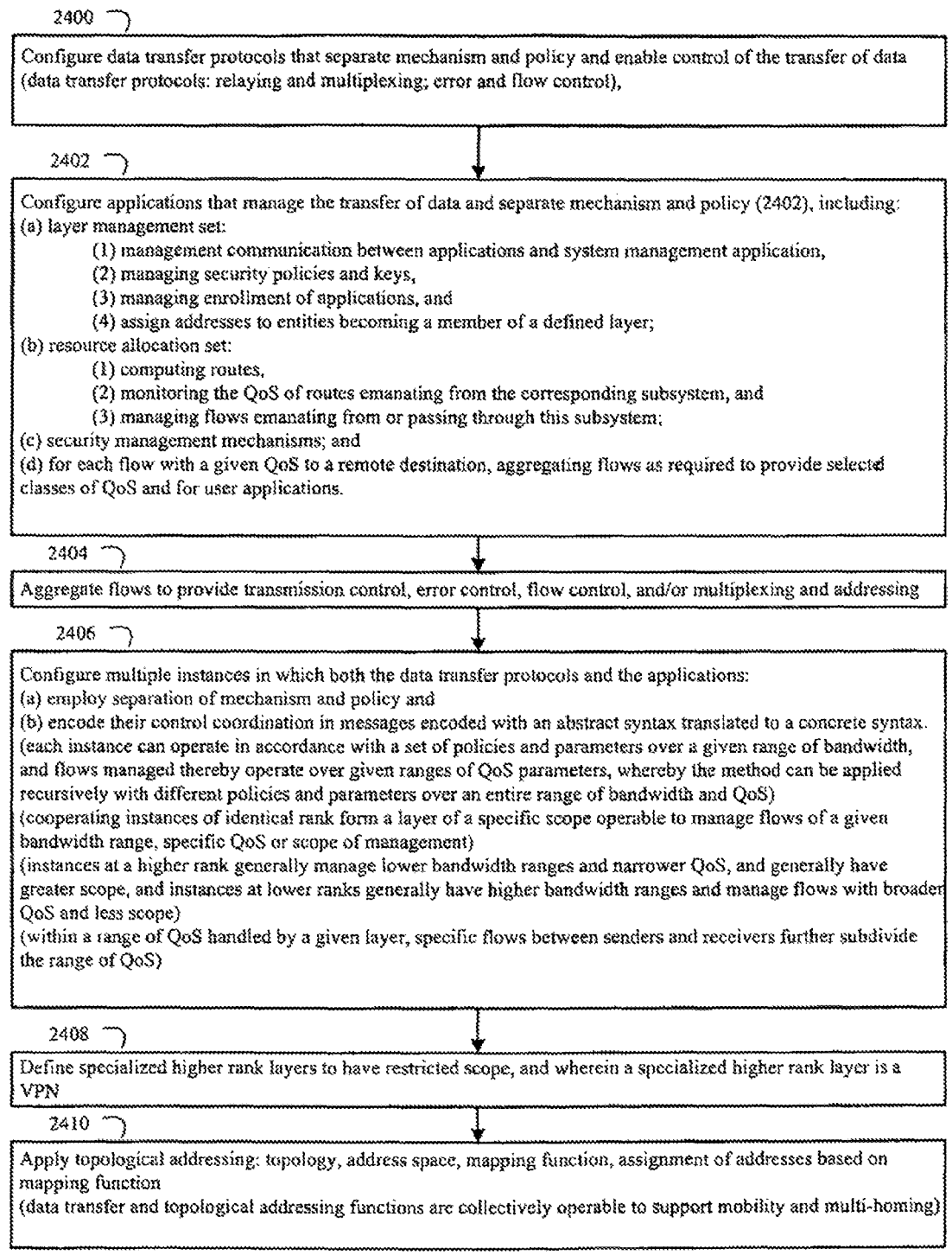
FIG. 24 is a flowchart illustrating a practice of the invention relating to recursion.

Recursion: As shown in FIG. 24, a method in accordance with the invention for transferring data between entities in a network, can include configuring data transfer protocols that separate mechanism and policy and enable control of the transfer of data (2400), and configuring applications that manage the transfer of data and also separate mechanism and policy (2402).

The configuring of applications (2402) may include the provision of one or more of:
  (a) a layer management set comprising one or more of:
    (1) providing management communication between the applications and a system management application;
    (2) managing security policies and keys,
    (3) managing the enrollment of applications, and
    (4) assigning addresses to entities becoming a member of a defined layer;
  (b) a resource allocation set comprising one or more of:
    (1) computing routes,
    (2) monitoring the QoS of routes emanating from the corresponding subsystem, and
    (3) managing flows emanating from or passing through this subsystem;
  (c) security management mechanisms; and
  (d) for each flow with a given QoS to a remote destination, aggregating flows as required to provide selected classes of QoS and for user applications.

A method according to the invention can also include aggregating flows as required to provide any of transmission control, error control, flow control, and/or multiplexing and addressing (2404), and configuring multiple, recursive instances of the foregoing steps (2406). In one practice of the invention, both the data transfer protocols and the applications in each instance employ separation of mechanism and policy, and encode their control coordination in messages encoded with an abstract syntax translated to a concrete syntax. Each instance can operate in accordance with a set of policies and parameters over a given range of bandwidth, and flows managed thereby operate over given ranges of QoS parameters. In this way, the method can be applied recursively with different policies and parameters over an entire range of bandwidth and QoS.

Still further, the method can be applied so that cooperating instances of identical rank form a layer of a specific scope operable to manage flows of a given bandwidth range, specific QoS or scope of management. Instances at a higher rank generally manage lower bandwidth ranges and narrower QoS, and generally have greater scope, and instances at lower ranks generally have higher bandwidth ranges and manage flows with broader QoS and less scope. Within a range of QoS handled by a given layer, specific flows between senders and receivers further subdivide the range of QoS.

It is also possible to define specialized higher rank layers (2408 in FIG. 24) to have restricted scope. One example of such a higher rank layer is a VPN. Still further, 10 the topological addressing aspects described above can be applied (2410).

A key feature of this aspect of the invention is the ability to recursively execute the configuring steps described above to create subnetworks wherein, as the number of entities in the network increases, the number of addressable elements to be managed within a subnetwork remains substantially constant.

V. Technical Advantages

The present invention, as described above and depicted by way of example in the attached drawing figures, provides a number of technical advantages over conventional network practice, including those relating to scaling, addressing, security, multicast, mobility, Quality of Service (QoS), network management, and engineering costs, as will next be described.

A. Scaling

Scalability is perhaps the foremost problem facing networking today. This invention provides substantial improvements in scaling over distance, numbers of nodes, and ranges of bandwidth. Conventional networking with one layer does not scale, nor does any architecture with different, hand-crafted protocols in two, three, four, or even seven layers. Scaling is enabled by having a single layered structure that repeats. The repeating single layer structure can allow a "divide and conquer" approach to traditional networking elements where scaling is problematic, such as routing, multicast, multihoming, mobility, quality of service, and security. Layers are created for distinct ranges of bandwidth and scope, thus bounding the computation and memory required for the traditional functions (routing, address assignment, flow management, QoS monitoring, security) of the layer. Each new problem does not require new concepts but can be built efficiently and effectively from a small set of defined concepts.

B. Addressing

In conventional networking, addresses have no topological significance nor is there any topological relation between addresses in adjoining layers. The invention described herein uses a novel approach to addresses, in which addresses are assigned consistent with a topology imposed on the address space.

Route Calculation and Table Size: The use of topological addresses eliminates the need to calculate the vast majority of routes they can be derived directly from the address. Forwarding tables can also be generated with much less effort. The only routes that must be calculated are those that do not "follow the topology." This capability is analogous to (but not the same as) the fact that on a true city grid, if one knows the location of an intersection one knows everything required to create a route to that intersection (with the exception of possible diagonal streets). For example, knowing the location of "135th Avenue and 250th Street" can permit one to immediately calculate that they need to "go North 10 blocks, and East 4 Avenues" via anyone of multiple possible paths. This approach, combined with the layer structure, means that the number of routes that must be stored can be profoundly reduced, requiring less routing information to be exchanged, and permitting much faster response to and recovery from failure. Only a small number of routes must be calculated; these are the exceptions to the topology, e.g., a 'diagonal' or shortcut, or, in our metaphor, a street that doesn't go through. This, combined with the layer structure, means that the number of routes that must be stored can be profoundly reduced, requiring less routing information to be exchanged, responding much faster to failure, and reducing routing update storms—and significantly reducing interruption of time-sensitive applications such as Voice over IP (VoIP). This invention also avoids single-minded optimization, thus reducing route thrashing and simplifying management.

Multihoming: Consistent naming of the layer also permits multi-homing to be accommodated without the introduction of any additional mechanisms. In traditional networks, addresses may only be assigned to points of attachment. Since PDUs can only be routed to the points of attachment, a host with multiple points of attachment appears to be multiple hosts to the network (one for each point of attachment). In our system, points of attachment also have addresses, but these are in a lower layer. There are also distinct upper-layer addresses that are the destination addresses to which data is routed. PDUs can thus be routed through the multiple lower layer addresses on the way to one upper layer address. In this way, a host with multiple points of attachment appears as a single host (that is, a single point) to the network, and at the same time, different paths to the same place are distinguishable. This greatly simplifies the network and further lower costs.

C. Security

The present invention is capable of greatly improving the security of networks. It enhances conventional communication security mechanisms to achieve much greater levels of security. For 30 years, it has been well known that it is impossible to retrofit security into an existing operating system. A similar situation now exists for networking software. The single repeating layer of this system can be implemented once to be secure and then re-used, which is far more secure and far less expensive than securing each protocol separately. Applications and routing software use the security features of the layer to achieve security at far less cost and with far less management overhead.

Furthermore, the layer structure implicitly compartmentalizes the network, so that core resources are not even addressable by hosts or equipment in the periphery and thus safe from attacks. In conventional networking, every device has a (global) IP number, and thus can be 'seen' by anyone on the network—and is thus prone to attack. In our system, the recursive layer structure implicitly compartmentalizes the network. Routers in a backbone will be in their own address space, the details of which (such as the structure of their address space or the addresses of particular routers) are not known to users on other networks. In this way, core resources are not even addressable by hosts or equipment in the periphery. That equipment thus cannot be used a platform from which to attack the core—a major improvement in security. This can be accomplished in lower layers without the use of firewalls or Network Address Translation (NATs).

In a conventional system, source addresses may be spoofed—and thus unreliable indicators of where an attack came from. This, and having no real flow control, makes it very difficult to squelch an attack. In our system there is management of flows. Once an attack is discovered, it is directly known on which intermediate flow it originated, which points to the source even if the source address has been spoofed. Once the intermediate flow is known, that specific flow may be shut down, thus ending the threat. Cooperating management entities may trace the sequence of intermediate flows back to the actual source of the attack, even if the actual addresses have been spoofed. Furthermore, a spoofed address can be detected and immediately countered.

In conventional networking, the majority of viruses attack flawed implementations. The single repeating layer of this system can be implemented once to be secure and then re-used. Since there is only one secured layer, it can economically be subjected to a very high degree of scrutiny, which will then apply everywhere the layer is used. This will be far more secure and far less expensive than securing each protocol separately. Rather than distinct security for each application (as in done in conventional networking), applications and routing software use the security features of the layer to achieve security at far less cost and with far less management overhead.

D. Multicast

This system leverages conventional multicast techniques, allowing them to scale to groups with millions of members. It permits far more effective calculation of multicast groups as well as the multiplexing of multicast groups. Conventional networking must calculate a single spanning tree to support a multicast group. As the size of a multicast group increases, the cost of maintaining a single large spanning tree becomes burdensome—it does not scale. Our system uniquely leverages conventional multicast techniques, allowing them to scale to groups with millions of members. By recursing, the problem is subdivided into multiple spanning trees at lower layers, each calculated independently. Since the number of elements in anyone subnet is bounded, the calculation is bounded and much smaller. Furthermore, this system allows the multiplexing of multicast groups. The common subtrees of groups in the layer above are multiplexed into a single tree in the layer below. This approach greatly increases the efficiency of multicast services.

E. Mobility

The present invention enables a mobility solution that truly scales and does not resort to centralized routing. In conventional networking, an end-user system has only one address, which is its point of attachment to the network. If the end-user system moves, there are no inherent mechanisms to determine where it has moved to; it is necessary to add mobility-specific mechanisms. In the distributed approach of the invention, only the application address is constant (that is, location-independent). As an end-user system moves, its point of attachment to the network changes, and thus its lower layer addresses change, requiring its routing information to be updated. In this system, mobility is synonymous with dynamic multi-homing.

As above, each device can have an address for both its attachment point to the network (via a lower layer) as well as an upper level address. As an end-user device moves from one (lower layer) point of attachment to another (lower layer) point of attachment, the new point of attachment would go through the address assignment process, and at some point data would start to flow on the new link, and the old one would disappear as the system continued to move. However, its upper level address would remain unchanged. Directory entries would be updated to reflect the new association between lower- and upper-layer addresses—a regular process in our system. Mobility is accomplished with completely regular processes and does not require specific, additional mechanisms.

Thus, distinct protocols for mobility are not required, greatly simplifying the system, lowering its cost and making it easier to manage. Since the scope of the lowest layer is relatively small it is possible to keep the information current. As scope increases the time to distribute the address changes increases, but the frequency with which addresses change decreases. This allows mobility to be supported in such a manner that it scales. No concept of "home" (a guaranteed bottleneck) is required except for billing, which has little or no time or performance criticality associated with it.

F. Quality of Service

The present invention provides support for a general approach to strong QoS that is not available under existing methods, and can be applied to any application. The ability to change policy on the data transfer protocols allows much greater tailoring of flows and thus provides some classes of QoS. Our approach to multiplexing allows a much more analytical approach to QoS that can reduce congestion, and increase capacity utilization. In addition, the aggregation of traffic can decrease switching loads on processors by a significant degree. Finally, multiple levels of QoS enable broad penetration of time-sensitive applications such as Voice over IP (VoIP) and streaming video.

Conventional networking only supports QoS by use of circuit-switched technology, which supports neither rapid response to failure (it is not robust) nor fast connection setup times. Internetworking, which does support rapid response to failure and fast connection setup times, does not support QoS. Attempts to impose QoS on conventional Internetworking have limited themselves to describing quality of service in terms of the requirements of the application; they do not provide any direction on how to provide that quality of service, nor do they precisely quantify what quality of service the application desires. Our system, which does support rapid response to failure and fast connection setup times, provides support for a general approach to strong QoS. The unique ability to change policy on the data transfer protocols allows switching of policies dynamically per flow (that is, much greater tailoring of flows) and thus provides some classes of QoS.

One of the major problems in today's networks is that they must manage a range of bandwidth over at least 6 orders of magnitude in a single layer. This is essentially unmanageable. In a system in accordance with the invention, layers subdivide such wide ranges of bandwidth into smaller fixed ranges, thus making the management of anyone layer tractable. The repeating nature of the system allows this "divide and conquer" approach to be applied to the problem, thus ensuring that it scales.

G. Network Management

Because conventional networks are composed of individually-specified protocols with few commonalties, conventional network management is unable to make significant assumptions about the common characteristics and behavior of objects under management. This makes the impact of management actions unpredictable. It also results in a proliferation of expensive, custom, "hand-made" management solutions. In the present invention, simpler, more common management information is possible, making management activities more regular, and tractable over a broader range of management assumptions. This commonality alone creates an immense simplification in network management systems and the operations of networks, thus requiring far fewer expert personnel. The scope of devices under management is also more effectively partitioned, again simplifying management.

The potential improvements in network management are primarily in two areas. First, common protocols means many fewer protocols, which in turn means that many fewer MIBs are required. (Different MIB information will be required for the specific implementation aspects (both hardware and software), but the communications aspects will all be the same.) This makes it easier for management to relate the behavior of one layer to another. It also means that a network management system will be able to manage a device about which it has no specific information. It can manage protocol aspects without knowing anything about the specific hardware or software aspects.

Second, the recursion of the layers means that network management applications can sit on top of any layer that has sufficient scope to reach all the devices under their management. Thus, for example, a LAN manager might operate over a single layer; an ISP might choose to partition management between the core and regions by having distinct management systems on top of lower layers for the core and on higher subnets for upper layers, while another ISP might choose to have a single management system for the core and regions located on top of the highest layer within the domain of the ISP, etc. The compartmentalization described above can also be used to isolate network management systems from customer's equipment thus protecting them from many virus or denial of service attacks.

The present invention is capable of reducing the cost of engineering new protocols for new media. Since a set of reusable layer protocols is provided, new protocols will not be required for operation in new environments. Instead, new policies can be developed as required, and, since libraries will be re-usable they can be available off-the-shelf. The time required to develop policies is far shorter than developing entirely new programs, as there is no coding and code debugging phase. The basic error control and relaying protocols can inexpensively be configured with the 5 appropriate policies and then transferred to hardware implementations.

The foregoing embodiments and practices are described solely by way example, and are not intended to limit the scope of the invention. Those skilled in the art will appreciate that numerous variations and modifications of the foregoing examples are possible and within the scope of the invention, which is limited solely by the appended claims.

What is claimed is:

1. A method comprising:
defining, by a system including a processor, an address space comprising a set of strings having a topological structure;
defining, by the system, a mapping function with a range of the address space and a domain of a group of entities; and
assigning, by the system, respective addresses to the group of entities based on the mapping function, wherein the addresses assigned to the set of entities are topologically dependent,
wherein the group of entities is expandable in a repeatable manner to establish a recursive layered structure,
wherein the group of entities provides interprocess communication service resources to an adjacent layer of the recursive layered structure,
wherein the group of entities is partitioned into subsets of entities,
wherein a first entity in a first subset of the subsets of entities communicates with a second entity in the first subset using an address that is selected from the address space,
wherein the first entity in the first subset is assigned an address from the address space that is unique within the first subset,
wherein the mapping function includes assigning addresses corresponding to nodes of a tree structure to addressable entities, and
wherein a composition of each address uniquely identifies a position of a node in the tree structure.

2. The method of claim 1, wherein a plurality of first addresses in a first layer of the recursive layered structure are assigned based on being related to a plurality of second addresses in an immediately adjacent second layer of the recursive layered structure using a topological mapping between the first and second layers.

3. The method of claim 1, wherein the mapping function is based on a topology having a distance function $d(a, b)$, where d is the distance function, and a and b are assigned addresses having the following properties:
$d(a, b) \geq 0$ for all values of a and b;
$d(a, b)=0$ if and only if $a=b$; $d(a, b)$, $d(b, a)$; and
$d(a, c) \leq d(a, b)+d(b, c)$.

4. The method of claim 3, wherein an orientation is associated with the address spaces.

5. The method of claim 1, wherein the recursive layered structure includes outgoing communications links operable to carry messages, and wherein the addresses comprise destination addresses, and further comprising:
generating a table of addresses to be assigned, wherein all messages to be sent to a group of destination addresses in proximity to each other are routed on a same outgoing link.

6. The method of claim 5, further comprising storing routes associated with messages and destinations, and wherein a number of the routes that need to be stored is reduced to only a group of routes of a local sub-network.

7. The method of claim 6, further comprising determining the routes based on knowledge of topologically-dependent addresses.

8. The method of claim 1, wherein an upper layer of the recursive layered structure obtains interprocess communication services from a lower layer of the recursive layered structure without utilizing knowledge of addresses of the lower layer and further comprising:
maintaining, by the system, routing information to be constant in a core subnet associated with the recursive layered structure unless a failure is detected.

9. The method of claim 1, wherein a number of addressable elements within the subsets of entities remains substantially constant as a number of the network entities increases due to network expansion.

10. A non-transitory computer-readable storage medium comprising computer instructions which, responsive to being executed by a processor, cause the processor to perform operations comprising:
defining a mapping function, wherein the mapping function is defined with a range of an address space and a domain of a group of entities; and assigning addresses to the group of entities based on the mapping function, wherein the addresses assigned to the group of entities are topologically dependent, wherein the group of entities is expandable in a repeatable manner to establish a recursive layered structure, wherein the group of entities provides interprocess communication service resources to an adjacent layer of the recursive layered structure, wherein the group of entities is partitioned into subsets of entities, wherein a first entity of a first subset of the subsets of entities communicates with other entities in the first subset using an address that is selected from the address space, wherein each entity in the first subset is assigned an address from the address space that is unique within the first subset, wherein the subsets of entities represents layers of the recursive layered structure, wherein first addresses in a first layer of the recursive layered structure are assigned based on being related to second addresses in an immediately adjacent second layer of the recursive layered structure using a topological mapping between the first and second layers, and wherein the mapping function includes assigning addresses corresponding to a geographical location to addressable entities, and wherein a composition of each address uniquely identifies a location associated with an addressable entity.

11. The non-transitory computer-readable storage medium of claim 10, wherein the operations further comprise:
defining the address space that comprises a set of strings having a topological structure.

12. The non-transitory computer-readable storage medium of claim 10, wherein the defining of the mapping function further comprises defining the mapping function to include the properties of a topology between address spaces in adjoining layers, such that the upper layer forms a covering of a collection of lower subnets or layers.

13. The non-transitory computer-readable storage medium of claim 10, wherein an orientation is associated with the address space and wherein a number of addressable elements within the subsets of entities remains substantially constant as a number of the group of entities increases due to network expansion.

14. The non-transitory computer-readable storage medium of claim 10, wherein an upper layer of the recursive layered structure obtains interprocess communication services from a lower layer of the recursive layered structure without utilizing knowledge of addresses of the lower layer.

15. The non-transitory computer-readable storage medium of claim 10, wherein the mapping function is based on a table containing a plurality of addresses in the first and second layers and including connectivity information and is performed utilizing a mathematical relationship that preserves a direction property.

16. A system comprising:
a memory comprising computer instructions; and
a controller coupled with the memory, wherein the controller, responsive to executing the computer instructions, performs operations comprising:
defining an address space comprising a set of strings having a topological structure;
defining a mapping function, wherein the mapping function is based on a range of the address space and a domain of a group of entities; and
assigning addresses to the group of entities based on the mapping function, wherein the addresses assigned to the group of entities are topologically dependent,
wherein the group of entities is expandable in a repeatable manner to establish a recursive layered structure,
wherein the group of entities provides interprocess communication service resources to an adjacent layer of the recursive layered structure,
wherein the group of entities is partitioned into subsets of entities, wherein each entity in a first subset communicates with other entities in the first subset using an address that is selected from the address space,
wherein each entity in the first subset is assigned an address from the address space that is unique within the first subset,
wherein the subsets of entities represent layers of the recursive layered structure, and
wherein the mapping function includes assigning addresses corresponding to nodes of a tree structure to addressable entities, and
wherein a composition of each address uniquely identifies a position of a node in the tree structure.

17. The system of claim 16, wherein first addresses in a first layer of the recursive layered structure are assigned based on being related to second addresses in an immediately adjacent second layer of the recursive layered structure using a topological mapping between the first and second layers, and wherein a number of addressable elements within the subsets of entities remains substantially constant as a number of the entities increases due to network expansion.

18. The system of claim 17, wherein the mapping function is based on a table containing addresses in the first and second layers and including connectivity information and is performed utilizing a mathematical relationship that preserves a direction property for some nodes of a network.

19. The system of claim 16, wherein an orientation is associated with the address space.

20. The system of claim 16, wherein an upper layer of the recursive layered structure obtains interprocess communication services from a lower layer of the recursive layered structure without utilizing knowledge of addresses of the lower layer.

* * * * *